United States Patent
Howard et al.

(10) Patent No.: US 10,671,264 B2
(45) Date of Patent: Jun. 2, 2020

(54) IMAGE DISPLAY AND INTERACTION USING A MOBILE DEVICE

(71) Applicant: Apple Inc., Cupertino, CA (US)

(72) Inventors: James A. Howard, Mountain View, CA (US); Jonathan R. Dascola, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/119,969

(22) Filed: Aug. 31, 2018

(65) Prior Publication Data

US 2019/0065039 A1 Feb. 28, 2019

Related U.S. Application Data

(62) Division of application No. 14/475,071, filed on Sep. 2, 2014, now Pat. No. 10,095,394.

(51) Int. Cl.

| G06F 3/048 | (2013.01) |
|---|---|
| G06F 3/0484 | (2013.01) |
| H04L 29/08 | (2006.01) |
| G06F 3/01 | (2006.01) |
| G06F 3/041 | (2006.01) |

(Continued)

(52) U.S. Cl.
CPC .......... *G06F 3/04847* (2013.01); *G06F 3/016* (2013.01); *G06F 3/0412* (2013.01); *G06F 3/0488* (2013.01); *G06F 3/04842* (2013.01); *G06F 3/04845* (2013.01); *G06F 16/27* (2019.01); *G06F 16/51* (2019.01); *H04L 67/04* (2013.01); *H04L 67/2823* (2013.01)

(58) Field of Classification Search
CPC . G06F 3/01; G06F 3/041; G06F 3/048; G06F 3/0481; G06F 3/0482; G06F 3/0484; G06F 17/30; H04L 29/08
See application file for complete search history.

(56) References Cited

U.S. PATENT DOCUMENTS

| 6,556,222 B1 | 4/2003 | Narayanaswami |
|---|---|---|
| 6,621,508 B1 | 9/2003 | Shiraishi et al. |

(Continued)

FOREIGN PATENT DOCUMENTS

| WO | 2013178528 | 12/2013 |
|---|---|---|
| WO | 2016036467 A2 | 3/2016 |
| WO | 2016036467 A3 | 4/2016 |

OTHER PUBLICATIONS

International Application No. PCT/US2015/043733, Invitation to Pay Add'l Fees and Partial Search Report dated Oct. 14, 2015, 6 pages (of-record in parent application).

(Continued)

*Primary Examiner* — Xiomara L Bautista
(74) *Attorney, Agent, or Firm* — Blank Rome LLP

(57) ABSTRACT

A system and method are described for delivering content to a mobile device using a companion device. The companion device acts as a proxy device to send and receive signals on behalf of other proxied devices. Once content is loaded onto the mobile device, a user can navigate through the content using a navigation path determined based on a user's item of focus. Various transitions and animations can be displayed along the navigation path. Moreover, a user can interact with the content when viewed in a specific layout using touch events or a rotation input device.

20 Claims, 16 Drawing Sheets

(51) Int. Cl.
*G06F 3/0488* (2013.01)
*G06F 16/27* (2019.01)
*G06F 16/51* (2019.01)

(56) References Cited

U.S. PATENT DOCUMENTS

| | | | | |
|---|---|---|---|---|
| 8,890,855 | B1* | 11/2014 | Lee | G06F 1/169 |
| | | | | 345/156 |
| 8,954,884 | B1* | 2/2015 | Barger | G06F 3/0485 |
| | | | | 715/792 |
| 10,095,394 | B2 | 10/2018 | Howard et al. | |
| 10,120,451 | B1* | 11/2018 | Fram | G06F 3/017 |
| 2008/0022228 | A1* | 1/2008 | Kwon | G06F 3/04817 |
| | | | | 715/838 |
| 2008/0062141 | A1 | 3/2008 | Chandhri | |
| 2008/0124005 | A1* | 5/2008 | Lin | G06F 3/017 |
| | | | | 382/313 |
| 2009/0006495 | A1 | 1/2009 | Ramasubramanian et al. | |
| 2010/0125816 | A1* | 5/2010 | Bezos | G06F 1/1626 |
| | | | | 715/863 |
| 2011/0072373 | A1* | 3/2011 | Yuki | G06F 3/04817 |
| | | | | 715/764 |
| 2011/0276396 | A1 | 11/2011 | Rathod | |
| 2012/0007891 | A1* | 1/2012 | Chiang | G06F 1/1626 |
| | | | | 345/650 |
| 2012/0275643 | A1 | 11/2012 | Beckford et al. | |
| 2013/0124508 | A1 | 5/2013 | Paris et al. | |
| 2014/0143446 | A1 | 5/2014 | Jacobson et al. | |
| 2014/0188844 | A1 | 7/2014 | Kogan | |
| 2014/0229839 | A1 | 8/2014 | Lynch et al. | |
| 2015/0288774 | A1 | 10/2015 | Larabie-Belanger | |
| 2016/0019634 | A1* | 1/2016 | Ke | G06F 3/017 |
| | | | | 705/15 |
| 2016/0062623 | A1 | 3/2016 | Howard et al. | |

OTHER PUBLICATIONS

International Search Report and Written Opinion for PCT Application No. PCT/US2015/043733, dated Mar. 14, 2016, 20 pages (of-record in parent application).

Notification of Transmittal of the International Search Report and the Written Opinion of the International Searching Authority dated Mar. 16, 2017 in International Application No. PCT/US2015/043733. 14 pages (of-record in parent application).

Non-Final Office Action issued in U.S. Appl. No. 14/475,071, dated Nov. 30, 2017 in 9 pages (of-record in parent application).

Notice of Allowance issued in U.S. Appl. No. 14/475,071, dated Jun. 7, 2018 in 5 pages (of-record in parent application).

Restriction Requirement issued in U.S. Appl. No. 14/475,071, dated Sep. 5, 2017 (of-record in parent application).

* cited by examiner

IMAGE DISPLAY AND INTERACTION USING A MOBILE DEVICE

CROSS-REFERENCED TO RELATED APPLICATIONS

This application is a divisional of co-pending U.S. patent application Ser. No. 14/475,071, filed Sep. 2, 2014 and entitled "Image Display And Interaction Using A Mobile Device," which is herein incorporated by reference in its entirety and for all purposes.

FIELD

The described embodiments relate generally to mobile devices. More particularly, the present embodiments relate to the display of images using a mobile device and user interactions therewith.

BACKGROUND

Recent advances in portable computing have made mobile electronic devices, such as laptops, palmtops, mobile phones, smart phones, multimedia phones, portable media players, GPS units, mobile gaming systems, etc., quite popular. Many users carry a device almost everywhere they go and use their device for a variety of purposes, including making and receiving phone calls, sending and receiving text messages and emails, navigation (e.g., using maps and/or a GPS receiver), purchasing items in stores (e.g., using contactless payment systems), sharing photos, listening to music or watching videos, and/or accessing the Internet (e.g., to look up information). A user's mobile device can be carried or worn and can perform a variety of smart functions in addition to traditional functions formerly implemented by a single application-specific device.

Mobile devices can have applications that access a variety of content, such as email and websites, photos, streaming audio/video, social media, and the like. Some applications can periodically receive notifications from services that new content is available. Such applications can "push" the content to a mobile device or send a notification that the new content is available. When a notification is received, the application can retrieve the new content. These services (e.g., update/upgrade services, news services, web blog services, podcast services, social networking services, or the like) allow users of mobile devices to interact with content wherever they may be.

The increase in the use of mobile devices magnifies the complexity of how users interact with content on their devices. One problem with this is that each one of a user's device can have different capabilities either in hardware or in software. Thus, users typically have to adapt to how they interact with the content from device to device. As mobile devices become smaller and integrate more functionality, new and innovated ways are needed to facilitate how users interact with content on their devices.

Accordingly, what is desired is to solve problems relating to coordinating and handling the delivery of content to and from user devices, some of which may be discussed herein. Additionally, what is desired is to reduce drawbacks relating to how users interact with content stored on certain mobile devices, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A system and method are described for delivering content to a mobile device using a companion device. The companion device acts as a proxy device to send and receive signals on behalf of other proxied devices. Once content is loaded onto the mobile device, a user can navigate through the content using a navigation path determined based on a user's item of focus. Various transitions and animations can be displayed along the navigation path. Moreover, a user can interact with the content when viewed in a specific layout using touch events or a rotation input device.

In one embodiment, a collection of images or photos is synchronized between a mobile device and a companion device. The mobile device establishes a wireless connection with the companion device and receives a signal indicating a change in a collection of images accessible to the companion device. The mobile device generates a signature of a collection of images stored in memory of the mobile device and sends the signature to the companion device. The mobile device receives a second signal generated by companion device based on the signature, which is indicative of an identifier for each image in the collection of images accessible to the companion device. The mobile device determines how the collection of images stored in the memory changes based on the second signal. The mobile device performs one or more actions based on the changes such as deleting images, downloads new images from the companion device, performing edits or other operations, or the like to modify the collection of images stored in the memory.

In one embodiment, the mobile device receives a dirty bit to signal any changes in a selected photo album of the companion device. The dirty bit may be sized to optimize communications between the mobile device and the companion device. In another embodiment, the mobile device generates the signature using a hash of a collection of images or a hash of a list of identifiers associated with a collection of images. The second signal can similarly be generated and send as a list of identifiers. Other information such as version information can be included in the second signal.

In some embodiments, a collection of images is navigated using a rotation input device that navigates the user interface (UI) of a mobile device through a predetermined path. A first set of a plurality of images stored by a mobile device can be rendered into a first layout, such as a grid or other optimized view, using a display device. Based on receiving rotation input from the rotation input device (e.g., a user manipulates a crown of a smart watch in a given direction), a second layout different from the first layout can be determined. A second set of the plurality of images different from the first set can be determined based on a navigation path (e.g., a path indicating how a view of the plurality of images would move—whether to expand or focus on the center image, etc.). The determined subset of the plurality of images can then be rendered into the second layout using the display device.

In some embodiments, a layout of images can be an optimized based on selection rules and arrangement rules.

Selection rules can select images to be grouped into or arranged in a layout based on selection criteria, image metadata (e.g., year, month day), most viewed images, starred images, facial recognition of contact, etc. Additional rotation input from the rotation input device can be used to scroll through images, initiate different types of transitions between images or layouts, and control animations of a transition.

In further embodiments, a collection of images is navigated using touch input that navigates the UI through a predetermined path. A set of a plurality of images stored on a mobile device is rendered into a first layout (e.g., a grid or optimized view of images) using a display device. A touch event triggered by a user interacting with the touch display can be received and used to determine a navigation path (e.g., what will be the center of the next view). A second set of the plurality of images can be determined based on the navigation path and the second set of the plurality of images rendered into a second layout different from the first using the display device.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

I. Introduction

A. System

Figure 1:
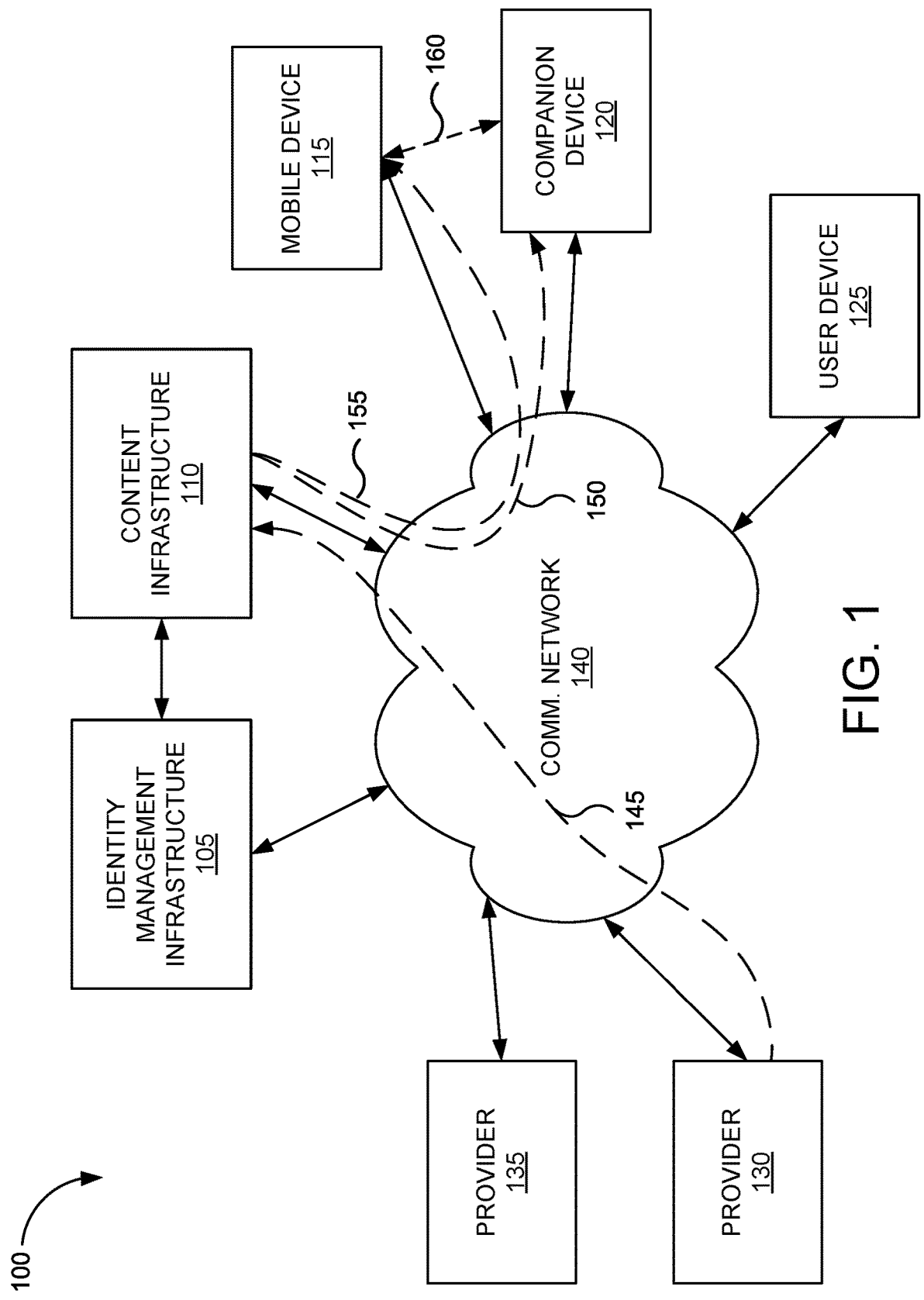
FIG. 1 is a block diagram of a system according to various embodiments.

FIG. 1 is a block diagram of a system 100 according to various embodiments. FIG. 1 and other figures are merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures. The devices in system 100 can include hardware and/or software elements.

In one embodiment, system 100 includes an identity management infrastructure 105, content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). Mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, image or video data, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of system 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, Identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device. In this example, companion device 120 can deliver or otherwise route the notification message to mobile device 115 as illustrated by path 160.

II. Content Synchronization

In various embodiments, content stored on one device (e.g., a companion device) can be synchronized with a mobile device. The companion device may be a device having more processing power, more memory, more battery, or the like. The companion device can act as a proxy device to send and receive signals on behalf of other proxied devices. Accordingly, companion devices act as main or intermediary devices for external services to route content to and from proxied devices or to synchronize existing content on the companion device with the proxied devices.

Figure 2:
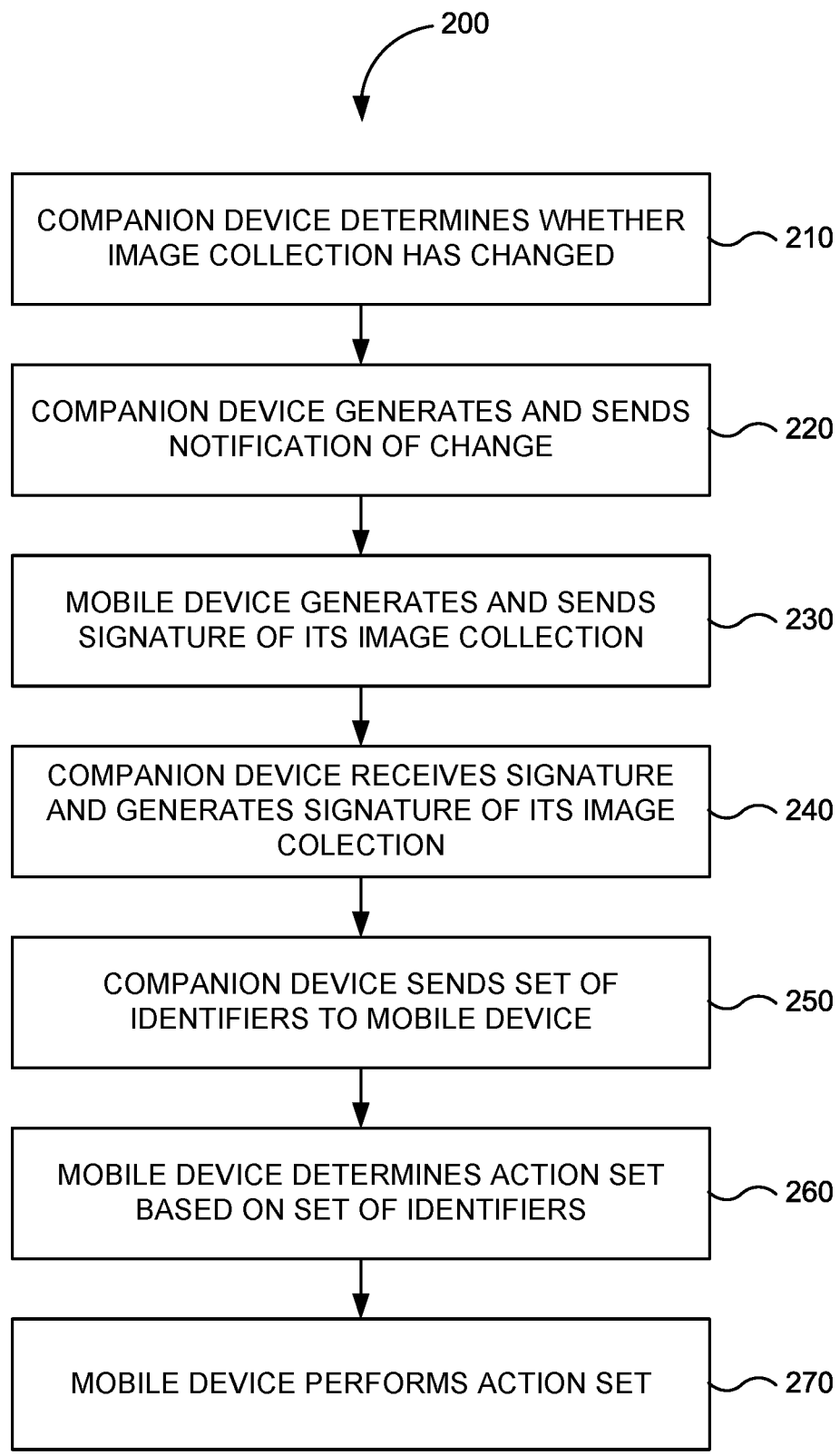
FIG. 2 is a flowchart of a method for synchronizing image collections between mobile devices and companion devices according to one embodiment.

FIG. 2 is a flowchart of method 200 for synchronizing image collections between mobile devices and companion devices according to one embodiment. Processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 210, a companion device (e.g., companion device 120) determines whether an image collection has changed. An image collection may change due to a variety of reasons. For example, the companion device may include a camera and any photos taken with the camera are stored in an image collection available on the companion device. In another example, a service (e.g. content infrastructure 110) to which the companion device connects can provide instruction and/or content that modify the collection of images stored on the companion device. In yet another embodiment, the companion device can connect with a service that hosts an image collection.

In the course of this procedure according to one embodiment, the companion device can maintain a set of identifiers that includes an identifier for all or part of the images in the image collection accessible to the companion device. An image identifier may uniquely identify the image relative to the collection of images or to all images accessible to the companion device. The companion device can compare the set of identifiers that it maintains with a set of identifiers for the current collection of images. Any difference in missing identifiers or added identifiers may be used to determine that the image collection has changed.

In step 220, the companion device generates a notification of the change and sends the notification to the mobile device. The notification can include any type or format of message that indicates that a change has occurred. In some embodiments, when the companion device is paired with a mobile device (e.g., mobile device 115) that utilizes more energy efficient communication protocols, the companion device can send a notification that at a minimum is indicative of a dirty bit. The dirty bit is recognized by the mobile device as indicating that new or updated content is available at or through the companion device.

In step 230, the mobile device generates a signature of an image collection stored on the mobile device and sends the signature to the companion device. A signature of an image collection may include hash or other check performed on one device that if performed by another device on the same data set results in the other device computing the same value, hash, check.

In step 240, the companion device receives the signature from the mobile device and generates a signature of the image collection available to it. If the signature generated by the mobile device is the same as the signature generated by the companion device, then no synchronization is needed between the devices. If the signature generated by the mobile device is different from the signature generated by the companion device, then in step 250, the companion device sends a set of identifiers that includes an identifier for all or part of the images in its image collection that should be made available on the mobile device.

In step 260, the mobile device receives the set of identifiers and determines an action set based on the set of identifiers. In one embodiment, the mobile device determines an add action for each identifier in the set of identifiers that is not present in a set of identifiers maintained by the mobile device that includes an identifier for all or part of an image collection on the mobile device. The add action instructs the mobile device to retrieve the image associated with the new identifier from the companion device. In another embodiment, the mobile device determines a delete action for each identifier in the set of identifiers maintained by the mobile device that is not present in the set of identifiers received from the companion device. The delete action instructs the mobile device to remove the image associated with the missing identifier from the set of identifiers received from the companion device.

In various embodiments, the mobile device determines an update action for one or more images in the image collection on the mobile device. The update action may be similar to an add action in that it instructs the mobile device to retrieve the image associated with the identifier from the companion device even if the image already exists on the mobile device. The update action can further instruct the mobile device to retrieve update information from the companion device for an image on the mobile device. The update information can include new data for a portion of the image, one or more edits or operations to be applied to the image to transform the image, or the like.

In various embodiments, the companion device may send version information together with the set of identifiers. The mobile device can compare the version information received from the companion device with its own version information. If a difference arises between the versions on an image, the mobile device can determine to perform an add action or an update action.

In step 270, the mobile device performs the action set. For an add action, the mobile device may add a new identifier associated with an image accessible to the companion device to a retrieval or download list. The mobile device can retrieve or download the new image when the mobile device is ready, for example, when battery conditions permit or when stable communications are available. For a delete action, the mobile device may remove an image from its storage. The mobile device may delete the image from its local storage or delete the identifier from the set allowing the image to be overwritten with a new image.

For an update action, the mobile device may add a new identifier associated with an image accessible to the companion device to the retrieval or download list if there are differences in version information. If the mobile device knows that one or more edits or operations are to be applied to an existing image, the mobile device can retrieve the edits or operations from the companion device.

Figure 3:
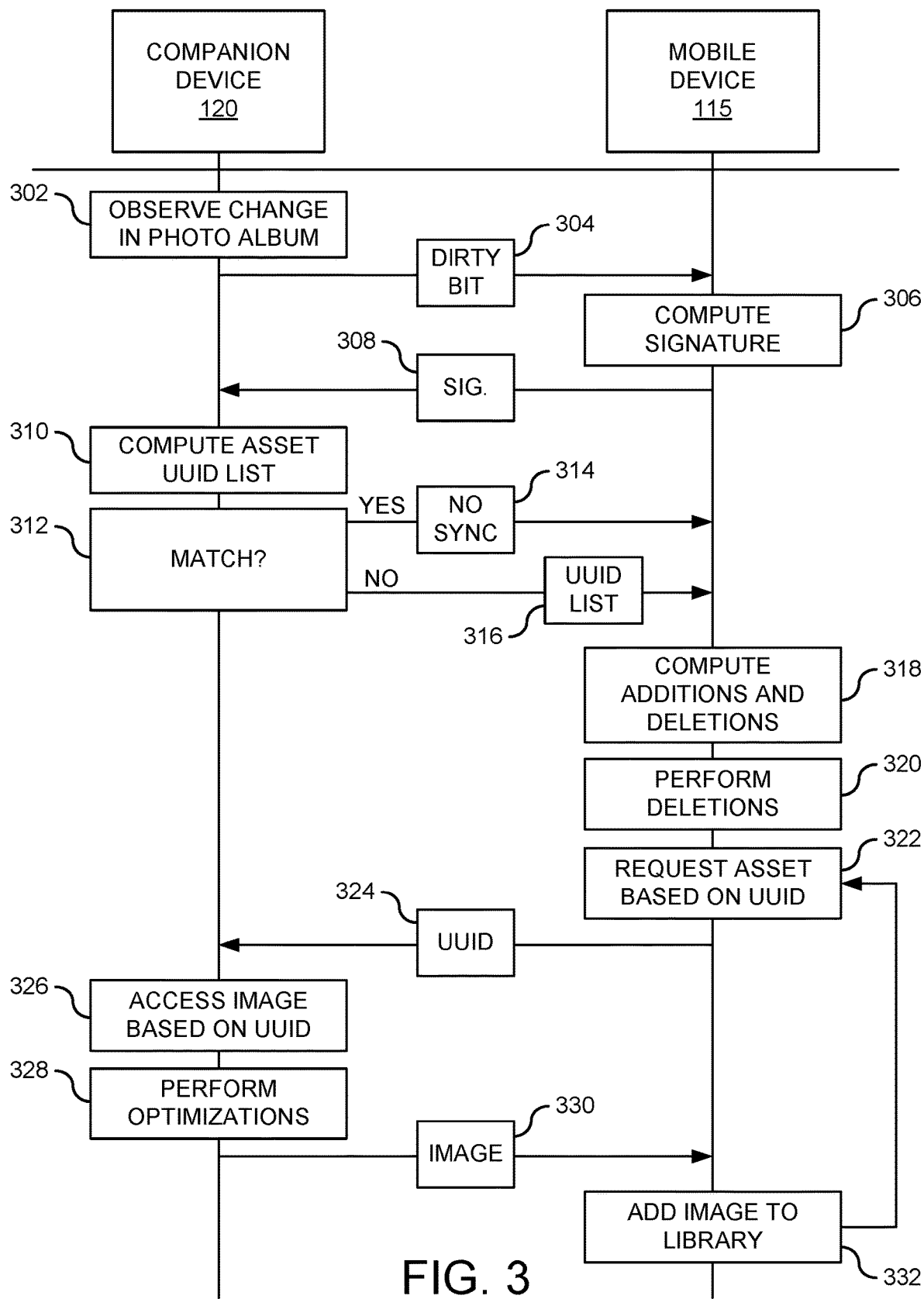
FIG. 3 illustrates a message sequence chart for synchronizing image collections between mobile devices and companion devices according to one embodiment.

FIG. 3 illustrates a message sequence chart for synchronizing image collections between mobile devices and companion devices according to one embodiment. In block 302, companion device 120 observes one or more changes in a photo album. As discussed above, the photo album can be local to companion device 120 or otherwise accessible to companion device 120. In some aspects, companion device 120 actively monitors the photo albums for changes. In another aspect, companion device 120 can receive a push notification of a change made at or by another device. In a change is observed, companion device 120 sends dirty bit 304 to mobile device 115.

In block 306, mobile device 115 generates signature 308 of its image collection and sends signature 308 to companion device 120. In block 310, companion device 120 receives signature 308 from mobile device 115 and computes an asset universally unique identifier (UUID) list. If a signature generated by companion device 120 from the asset UUID list is the same as signature 308 generated by mobile device 115, then no synchronization is needed between the devices and companion device 120 sends in block 112 no synchronization notification 314 to mobile device 115. If the signature generated by companion device 120 from the asset UUID list is different from signature 308 generated by mobile device 115, then in block 314, companion device 120 sends UUID list 316 to mobile device 115.

In block 318, mobile device 115 receives UUID list 316 and computes additions and deletions. In block 320, mobile device 115 performs deletions for images in its collection having UUIDs missing from UUID list 316. In block 322, mobile device 115 requests an asset to be added based on its UUID and sends UUID 324 to companion device 120. In block 326, companion device 120 accesses the image based on UUID 324.

In block 328, companion device 120 performs one or more optimizations to the image and sends image 330 to mobile device 115. In various embodiments, companion device 120 may resize the image based on information about mobile device 115, such as display size, resolution, memory capacity, or the like. In some embodiments, companion device 120 may convert the image into one or more formats usable by mobile device 115. Other optimizations, conversions, edits, or the like can be performed by companion device 120 before sending the image to mobile device 115.

In block 332, mobile device 115 includes image 330 in its library. Mobile device 115 may in turn retrieve the next asset in block 322. Mobile device 115 may perform asset requests in series or in parallel.

III. Content Navigation

A. Navigation Means

Figure 4A:
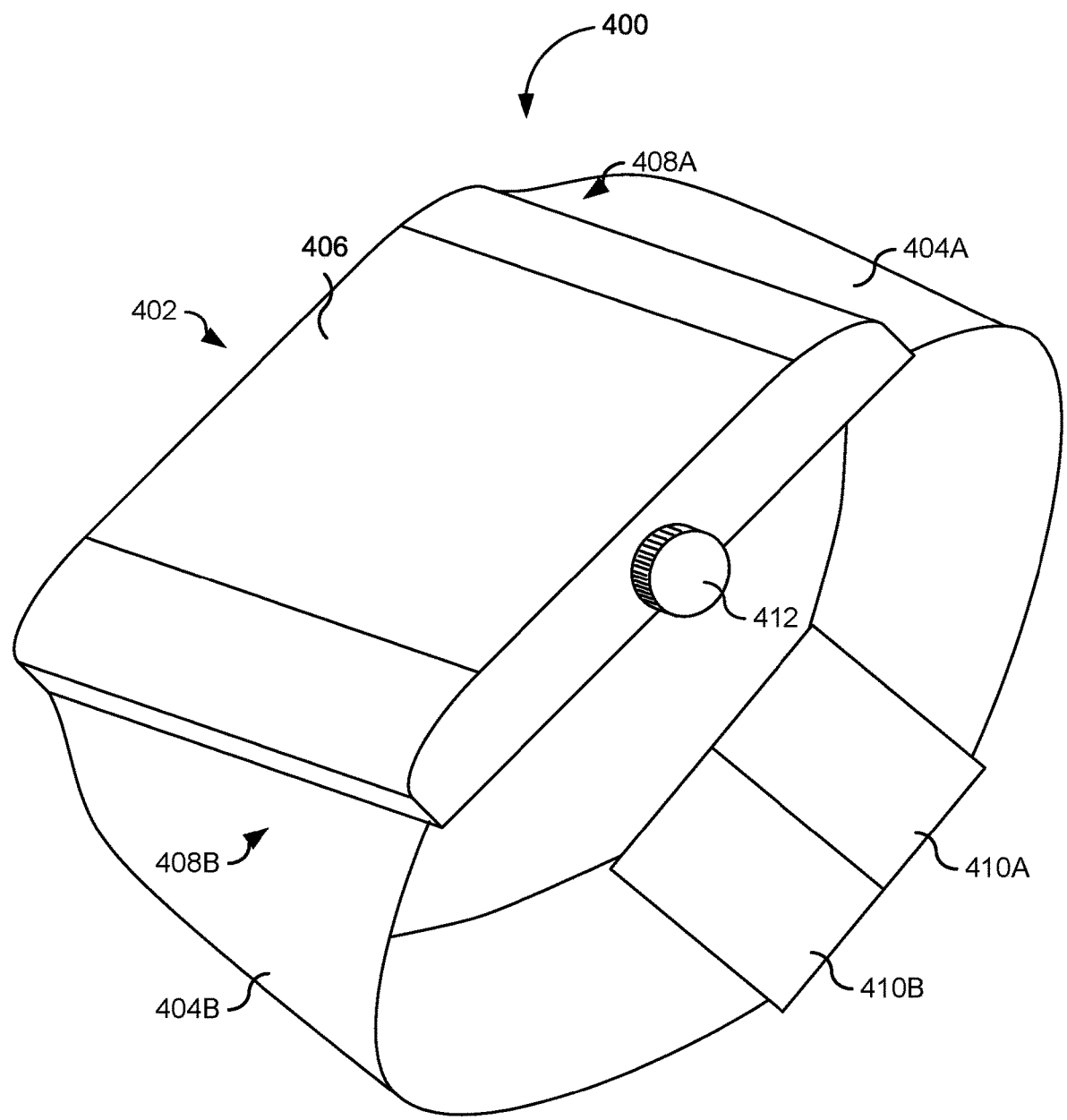
FIG. 4A shows a wearable device for communicating wirelessly with a companion device according to one embodiment.

FIG. 4A shows wearable device 400 for communicating wirelessly with a companion device according to one embodiment. In this example, wearable device 400 is shown as a wristwatch-like device with a face portion 402 connected to straps 404A, 404B.

Face portion 402 can include, e.g., a touchscreen display 406 that can be appropriately sized depending on where on a user's person wearable device 400 is intended to be worn. A user can view information presented by wearable device 400 on touchscreen display 406 and provide input to wearable device 400 by touching touchscreen display 406. In some embodiments, touchscreen display 406 can occupy most or all of the front surface of face portion 402.

Straps 404A, 404B can be provided to allow device wearable 400 to be removably worn by a user, e.g., around the user's wrist. In some embodiments, straps 404A, 404B can be made of any flexible material (e.g., fabrics, flexible plastics, leather, chains or flexibly interleaved plates or links made of metal or other rigid materials) and can be connected to face portion 402, e.g., by hinges. Alternatively, straps 404A, 404B can be made of a rigid material, with one or more hinges positioned at the junction of face 104 and proximal ends 408A, 408B of straps 404A, 404B and/or elsewhere along the lengths of straps 404A, 404B to allow a user to put on and take off wearable device 400. Different portions of straps 404A, 404B can be made of different materials; for instance, flexible or expandable sections can alternate with rigid sections. In some embodiments, one or both of straps 404A, 404B can include removable sections, allowing wearable device 400 to be resized to accommodate a particular user's wrist size. In some embodiments, straps 404A, 404B can be portions of a continuous strap member that runs behind or through face portion 402. Face portion 402 can be detachable from straps 404A, 404B; permanently attached to straps 404A, 404B; or integrally formed with straps 404A, 404B.

The distal ends of straps 404A, 404B opposite face portion 402 can provide complementary clasp members 410A, 410B that can be engaged with each other to secure the distal ends of straps 404A, 404B to each other, forming a closed loop. In this manner, device 100 can be secured to a user's person, e.g., around the user's wrist; clasp members 410A, 410B can be subsequently disengaged to facilitate removal of device 100 from the user's person. The design of clasp members 410A, 410B can be varied; in various embodiments, clasp members 410A, 410B can include buckles, magnetic clasps, mechanical clasps, snap closures, etc. In some embodiments, one or both of clasp members 410A, 410B can be movable along at least a portion of the length of corresponding strap 404A, 404B, allowing wearable device 400 to be resized to accommodate a particular user's wrist size.

Straps 404A, 404B can be two distinct segments, or they can be formed as a continuous band of an elastic material (including, e.g., elastic fabrics, expandable metal links, or a combination of elastic and inelastic sections), allowing wearable device 400 to be put on and taken off by stretching a band formed straps 404A, 404B. In such embodiments, clasp members 410A, 410B can be omitted.

Straps 404A, 404B and/or clasp members 410A, 410B can include sensors that allow wearable device 400 to determine whether it is being worn at any given time. Wearable device 400 can operate differently depending on whether it is currently being worn or not. For example, wearable device 400 can inactivate various user interface and/or RF interface components when it is not being worn. In addition, in some embodiments, wearable device 400 can notify a companion device (e.g., companion device 120) when a user puts on or takes off wearable device 400.

In various embodiments, wearable device 400 includes crown 412. Crown 412 can be used to perform a variety of functions. In some embodiments, crown 412 provides rotation input for navigating content. In this example, crown 412 includes a plastic or metal crown body, preferably having conventional outer teeth. Typically, a pedestal made integral with the body of crown 415 is positioned and protrudes into face portion 402. Crown 415 may be fastened, either permanently or removably, to hardware associated with wearable device 400.

It will be appreciated that wearable device 400 is illustrative and that variations and modifications are possible. For example, wearable device 400 can be implemented in any wearable article, including a watch, a bracelet, a necklace, a ring, a belt, a jacket, or the like. In some instances, wearable device 400 can be a clip-on device or pin-on device that has a clip or pin portion that attaches to the user's clothing. The interface portion (including, e.g., touchscreen display 406) can be attached to the clip or pin portion by a retractable cord, and a user can easily pull touchscreen display 406 into view for use without removing the clip or pin portion, then let go to return wearable device 400 to its resting location. Thus, a user can wear wearable device 400 in any convenient location.

Figure 5:
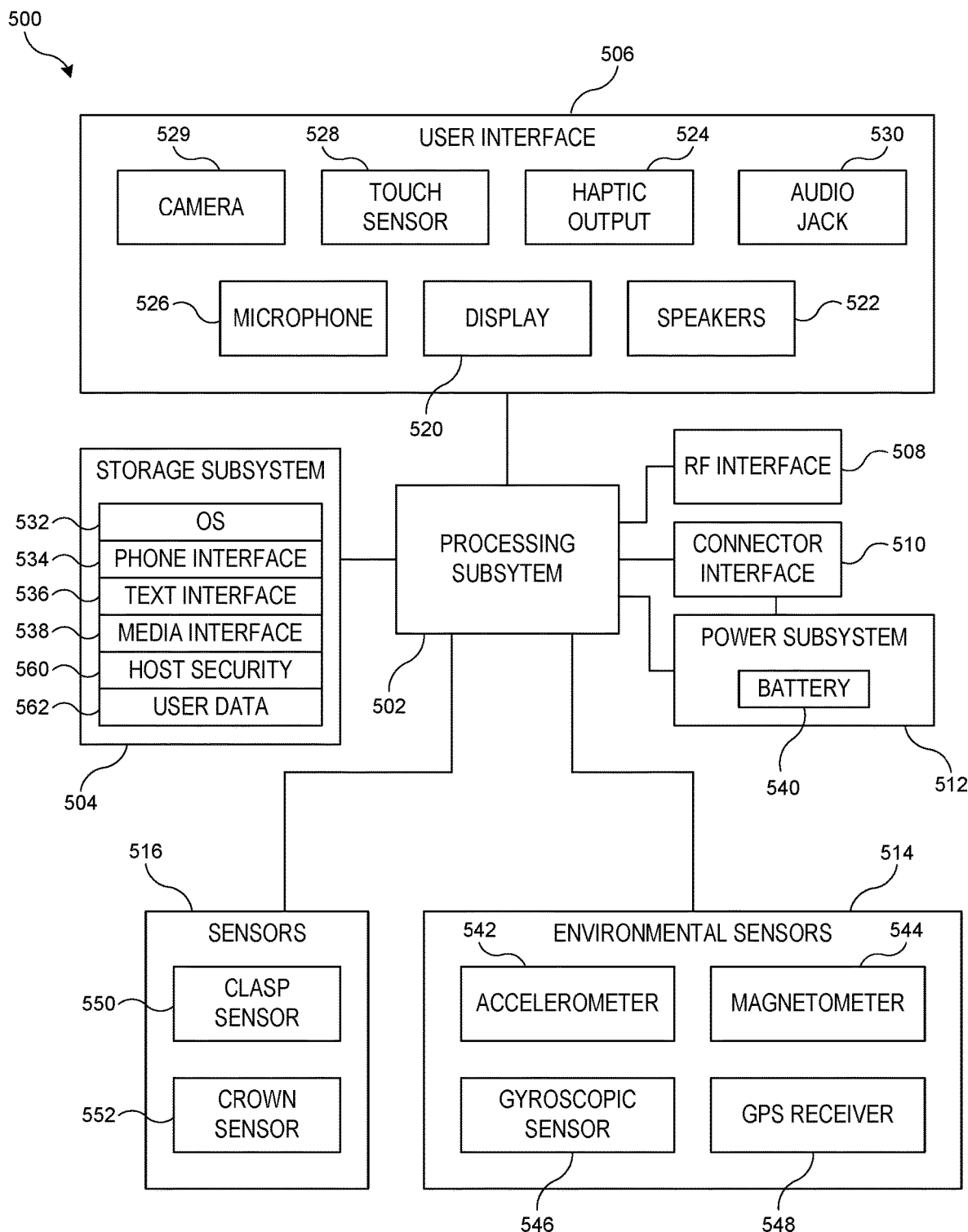
FIG. 5 is a simplified block diagram of the wearable device of FIG. 4A according to one embodiment.

Wearable device 400 can be implemented using electronic components disposed within face portion 402, straps 404A, 404B, and/or clasp members 410A, 410B. FIG. 5 is a simplified block diagram of wearable device 500 (e.g., implementing wearable device 400) according to an embodiment of the present invention. Wearable device 500 can include processing subsystem 502, storage subsystem 504, user interface 506, RF interface 508, connector interface 510, power subsystem 512, environmental sensors 514, and strap sensors 516. Wearable device 500 can also include other components (not explicitly shown).

Storage subsystem 504 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 504 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 504 can also store one or more application programs to be executed by processing subsystem 502 (e.g., video game programs, personal information management programs, media playback programs, interface programs associated with particular host devices and/or host device functionalities, etc.).

User interface 506 can include any combination of input and output devices. A user can operate input devices of user interface 506 to invoke the functionality of wearable device 500 and can view, hear, and/or otherwise experience output from wearable device 500 via output devices of user interface 506.

Examples of output devices include display 520, speakers 522, and haptic output generator 524. Display 520 can be implemented using compact display technologies, e.g., LCD (liquid crystal display), LED (light-emitting diode), OLED (organic light-emitting diode), or the like. In some embodiments, display 520 can incorporate a flexible display element or curved-glass display element, allowing wearable device 500 to conform to a desired shape. One or more speakers 522 can be provided using small-form-factor speaker technologies, including any technology capable of converting electronic signals into audible sound waves. In some embodiments, speakers 522 can be used to produce tones (e.g., beeping or ringing) and can but need not be capable of reproducing sounds such as speech or music with any particular degree of fidelity. Haptic output generator 524 can be, e.g., a device that converts electronic signals into vibrations; in some embodiments, the vibrations can be strong enough to be felt by a user wearing wearable device 500 but not so strong as to produce distinct sounds.

Examples of input devices include microphone 526, touch sensor 528, and camera 529. Microphone 526 can include any device that converts sound waves into electronic signals. In some embodiments, microphone 526 can be sufficiently sensitive to provide a representation of specific words spoken by a user; in other embodiments, microphone 526 can be usable to provide indications of general ambient sound levels without necessarily providing a high-quality electronic representation of specific sounds.

Touch sensor 528 can include, e.g., a capacitive sensor array with the ability to localize contacts to a particular point or region on the surface of the sensor and in some instances, the ability to distinguish multiple simultaneous contacts. In some embodiments, touch sensor 528 can be overlaid over display 520 to provide a touchscreen interface (e.g., touchscreen interface 105 of FIG. 1), and processing subsystem 502 can translate touch events (including taps and/or other gestures made with one or more contacts) into specific user inputs depending on what is currently displayed on display 520.

Camera 529 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 504 and/or transmitted by wearable device 500 to other devices for storage. Depending on implementation, the optical components can provide fixed focal distance or variable focal distance; in the latter case, autofocus can be provided. In some embodiments, camera 529 can be disposed along an edge of face member 402 of FIG. 4, e.g., the top edge, and oriented to allow a user to capture images of nearby objects in the environment such as a bar code or QR code. In other embodiments, camera 529 can be disposed on the front surface of face member 404, e.g., to capture images of the user. Zero, one, or more cameras can be provided, depending on implementation.

In some embodiments, user interface 506 can provide output to and/or receive input from an auxiliary device such as a headset. For example, audio jack 530 can connect via an audio cable (e.g., a standard 2.5-mm or 3.5-mm audio cable) to an auxiliary device. Audio jack 530 can include input and/or output paths. Accordingly, audio jack 530 can provide audio to the auxiliary device and/or receive audio from the auxiliary device. In some embodiments, a wireless connection interface can be used to communicate with an auxiliary device.

Processing subsystem 502 can be implemented as one or more integrated circuits, e.g., one or more single-core or multi-core microprocessors or microcontrollers, examples of which are known in the art. In operation, processing system 502 can control the operation of wearable device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage media such as storage subsystem 504.

Through suitable programming, processing subsystem 502 can provide various functionality for wearable device 500. For example, in some embodiments, processing subsystem 502 can execute an operating system (OS) 532 and various applications for interfacing with a host device, such as a phone-interface application 534, a text-interface application 536, and/or a media interface application 538. In some embodiments, some or all of these application programs can interact with a host device, e.g., by generating messages to be sent to the host device and/or by receiving and interpreting messages from the host device. In some embodiments, some or all of the application programs can operate locally to wearable device 500. For example, if wearable device 500 has a local media library stored in storage subsystem 504, media interface application 538 can provide a user interface to select and play locally stored media items. Examples of interface applications are described below.

In some embodiments, processing subsystem 502 can also execute a host security process 560 that provides support for establishing and maintaining a verified communication session with a host device. A verified communication session can provide an enhanced level of security, and various operations of wearable device 500 and/or a host device can be made conditional on whether a verified communication session between the devices is in progress. For instance, host security process 560 can facilitate unlocking a host device when wearable device 500 is present, depending on whether a verified session is in progress. User data 562 can include any information specific to a user, such as identification information, user-specified settings and preferences, customized information (e.g., contacts, predefined text messages), and any other user-related data or content. In some embodiments, executing applications and processes can access user data 562 to facilitate operations.

RF (radio frequency) interface 508 can allow wearable device 500 to communicate wirelessly with various host devices. RF interface 508 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 508 can be implemented using a combination of hardware (e.g., driver circuits, antennas, modulators/demodulators, encoders/decoders, and other analog and/or digital signal processing circuits) and software components. In some embodiments, RF interface 508 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 508.

Connector interface 510 can allow wearable device 500 to communicate with various host devices via a wired communication path, e.g., using Universal Serial Bus (USB), universal asynchronous receiver/transmitter (UART), or other protocols for wired data communication. In some embodiments, connector interface 510 can provide a power port, allowing wearable device 500 to receive power, e.g., to charge an internal battery. For example, connector interface 510 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from host device 202 in analog and/or digital formats.

In some embodiments, connector interface 510 and/or RF interface 508 can be used to support synchronization operations in which data is transferred from a host device to wearable device 500 (or vice versa). For example, as described below, a user can customize certain information for wearable device 500 (e.g., a "favorite" contacts list and/or specific predefined text messages that can be sent). While user interface 506 can support data-entry operations, a user may find it more convenient to define customized information on a separate device (e.g., a tablet or smartphone) that has a larger interface (e.g., including a real or virtual alphanumeric keyboard), then transfer the customized information to wearable device 500 via a synchronization operation. Synchronization operations can also be used to load and/or update other types of data in storage subsystem 504, such as media items, application programs, and/or operating system programs. Synchronization operations can be performed in response to an explicit user request and/or automatically, e.g., when wireless device 500 resumes communication with a particular host device or in response to either device receiving an update to its copy of synchronized information.

Environmental sensors 514 can include various electronic, mechanical, electromechanical, optical, or other devices that provide information related to external conditions around wearable device 500. Sensors 514 in some embodiments can provide digital signals to processing subsystem 502, e.g., on a streaming basis or in response to polling by processing subsystem 502 as desired. Any type and combination of environmental sensors can be used; shown by way of example are accelerometer 542, a magnetometer 544, a gyroscope sensor 546, and a GPS receiver 548.

Some environmental sensors can provide information about the location and/or motion of wearable device 500. For example, accelerometer 542 can sense acceleration (relative to freefall) along one or more axes, e.g., using piezoelectric or other components in conjunction with associated electronics to produce a signal. Magnetometer 544 can sense an ambient magnetic field (e.g., Earth's magnetic field) and generate a corresponding electrical signal, which can be interpreted as a compass direction. Gyroscopic sensor 546 can sense rotational motion in one or more directions, e.g., using one or more MEMS (micro-electro-mechanical systems) gyroscopes and related control and sensing circuitry. Global Positioning System (GPS) receiver 548 can determine location based on signals received from GPS satellites.

Other sensors can also be included in addition to or instead of these examples. For example, a sound sensor can incorporate microphone 526 together with associated circuitry and/or program code to determine, e.g., a decibel level of ambient sound. Temperature sensors, proximity sensors, ambient light sensors, or the like can also be included.

Sensors 516 can include various electronic, mechanical, electromechanical, optical, or other devices that provide information to wearable device 500. For instance, clasp sensor 550 can be at least partially disposed within either or both of clasp members 410A, 410B of FIG. 4 and can detect when clasp members 410A, 410B are engaged with each other or disengaged from each other. For example, engaging clasp members 410A, 410B to each other can complete an electrical circuit, allowing current to flow through clasp sensor 550; disengaging clasp members 410A, 410B from each other can break the circuit. As another example, one or more crown sensors 552 can be disposed to detect input from crown 412 of FIG. 4. Crown sensors 552 can also include motion sensors, accelerometers, pressure sensors (e.g., piezoelectric devices), or the like.

Any other type of sensor can be used in addition to or instead of strap sensors 516 and crown sensors 552. For instance, physiological or biometric sensors, such as pulse sensors, ECG sensors, or the like can be provided. In some embodiments, physiological or biometric sensors can be used in verifying the identity of the wearer of wearable device 500.

Power subsystem 512 can provide power and power management capabilities for wearable device 500. For example, power subsystem 512 can include a battery 540 (e.g., a rechargeable battery) and associated circuitry to distribute power from battery 540 to other components of wearable device 500 that require electrical power. In some embodiments, power subsystem 512 can also include circuitry operable to charge battery 540, e.g., when connector interface 510 is connected to a power source. In some embodiments, power subsystem 512 can include a "wireless" charger, such as an inductive charger, to charge battery 540 without relying on connector interface 510. In some embodiments, power subsystem 512 can also include other power sources, such as a solar cell, in addition to or instead of battery 540.

In some embodiments, power subsystem 512 can control power distribution to components within wearable device 500 to manage power consumption efficiently. For example, power subsystem 512 can automatically place device 500 into a "hibernation" state when strap sensors 516 indicate that device 500 is not being worn. The hibernation state can be designed to reduce power consumption; accordingly, user interface 506 (or components thereof), RF interface 508, connector interface 510, and/or environmental sensors 514 can be powered down (e.g., to a low-power state or turned off entirely), while strap sensors 516 are powered up (either continuously or at intervals) to detect when a user puts on wearable device 500. As another example, in some embodiments, while wearable device 500 is being worn, power subsystem 512 can turn display 520 and/or other components on or off depending on motion and/or orientation of wearable device 500 detected by environmental sensors 514. For instance, if wearable device 500 is designed to be worn on a user's wrist, power subsystem 512 can detect raising and rolling of a user's wrist, as is typically associated with looking at a wristwatch, based on information provided by accelerometer 542. In response to this detected motion, power subsystem 512 can automatically turn display 520 and/or touch sensor 228 on; similarly, power subsystem 512 can automatically turn display 520 and/or touch sensor 228 off in response to detecting that user's wrist has returned to a neutral position (e.g., hanging down).

Power subsystem 512 can also provide other power management capabilities, such as regulating power consumption of other components of wearable device 500 based on the source and amount of available power, monitoring stored power in battery 240, generating user alerts if the stored power drops below a minimum level, and so on.

In some embodiments, control functions of power subsystem 512 can be implemented using programmable or controllable circuits operating in response to control signals generated by processing subsystem 502 in response to program code executing thereon, or as a separate microprocessor or microcontroller.

It will be appreciated that wearable device 500 is illustrative and that variations and modifications are possible.

B. Navigation Paths

Figure 6:
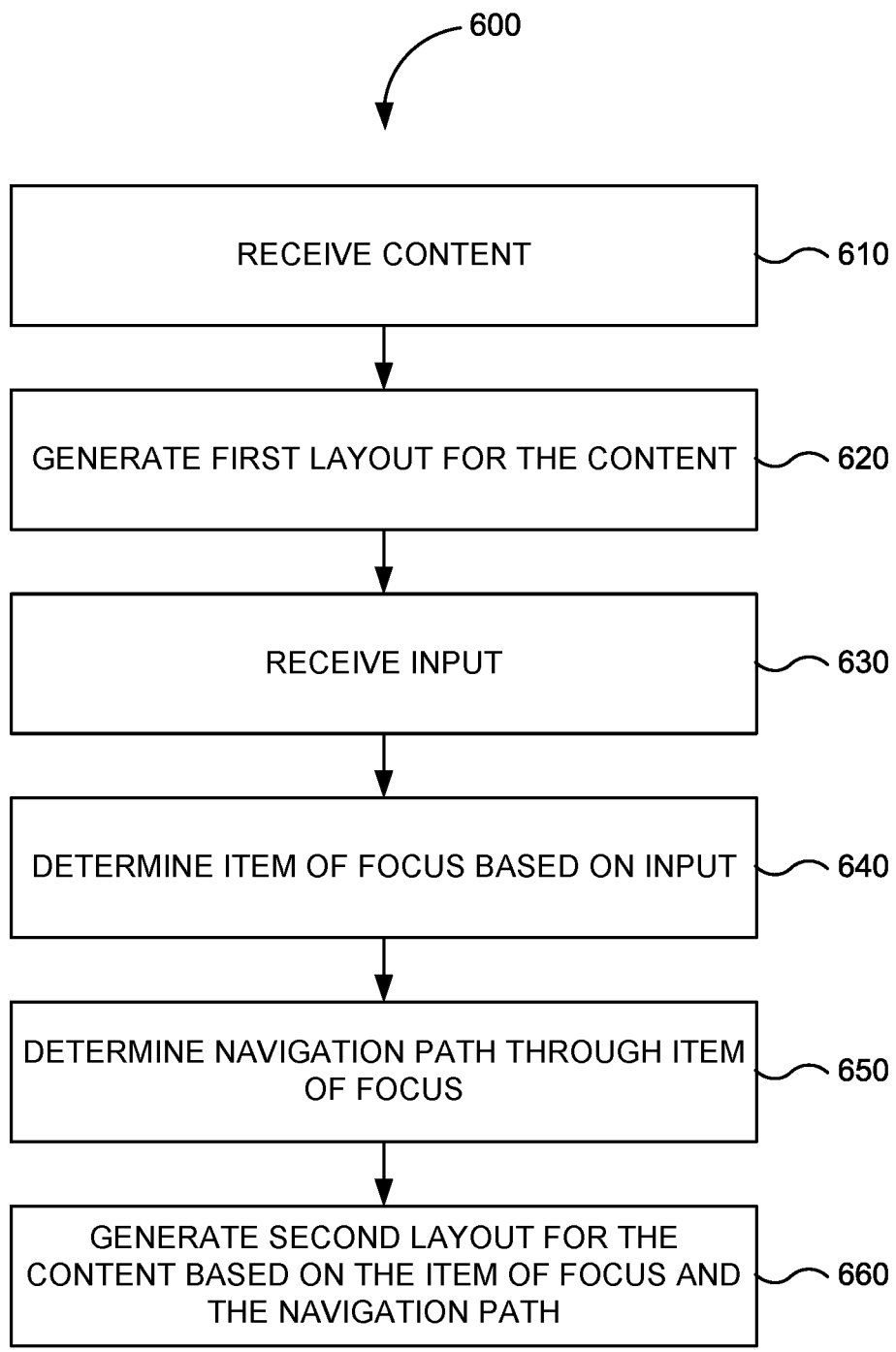
FIG. 6 is a flowchart of a method for navigating content on a mobile device according to one embodiment.

FIG. 6 is a flowchart of method 600 for navigating content on a mobile device according to various embodiments. Processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 610, content is received at a mobile device (e.g., mobile device 115 or wearable device 400). The content can include any type of information, such as text, audio, images or photos, video, multimedia information, documents, or the like. In step 620, a first layout is generated for the content. A layout can include any way in which parts of the content are arranged or laid out. Elements of the collection may be arranged individually, in groups, or the like. Some examples of layouts arrange elements in grids, rows, columns, tables, stacks, scrolls, or the like. In various embodiments, a content layout is determined based on the type of content. For example, for text content or documents, a grid may be presented having a predetermined number of visual representations of each text content or document.

In another example, a user's photos can be arranged in an initial grid based on a predetermined density factor. The density factor provides how many visual representations of the user's photos are to be arranged in the grid. The density factor can be set based on a predetermined value, such as the number of items in a collection or the area of a display. In some embodiments, the density factor can be adapted according to information collected about the content, the mobile device, or a user.

Visual representations of content base also vary based on the type of content or the content itself. For content having no intrinsic visual representation, such as audio information, one or more icons, tiles, or other images can be used to visually represent the content. For content having an intrinsic visual representation, such as images or video, all or party of the images or video can be represented in the layout. In some embodiments, one or more operations can be performed to determine a visual representation of a portion of content. In one aspect, facial recognition can be used on images in order to emphasis faces in the visual representation determined for the images. In another aspect, statistical or other collected information can be used to determine which visual representation is to be used to represent an individual item or a collection of items.

In step 630, input is received. The input can include or otherwise represent signals from one or more button sensors, crown sensors, or other hardware devices. The input can include or otherwise represent a touch, hold, swipe, multi-touch, or other gesture made using a touchscreen or touch device. Based on the input, an item of focus is determined in step 640. The item of focus can include an individual item in the content or a visually representation of a collection of items.

In step 650, a navigation path is determined. The navigation path represents a path through the first layout to the item of focus. The navigation path can be stored and used to navigate to another layout from the item of focus to the first layout. In step 660, a second layout is generated based on the item of focus and the navigation path. The second layout can include one or more elements of the collection arranged individually (i.e., as the item of focus), in groups, or the like. In various embodiments, the layout is determined based on the type of content and information about the item of focus. Continuing the previous example, the user's photos can be arranged in another grid based on another predetermined density factor. Grids can be more or less dense as a user travels through the navigation path to for from an item of focus.

Figure 7:
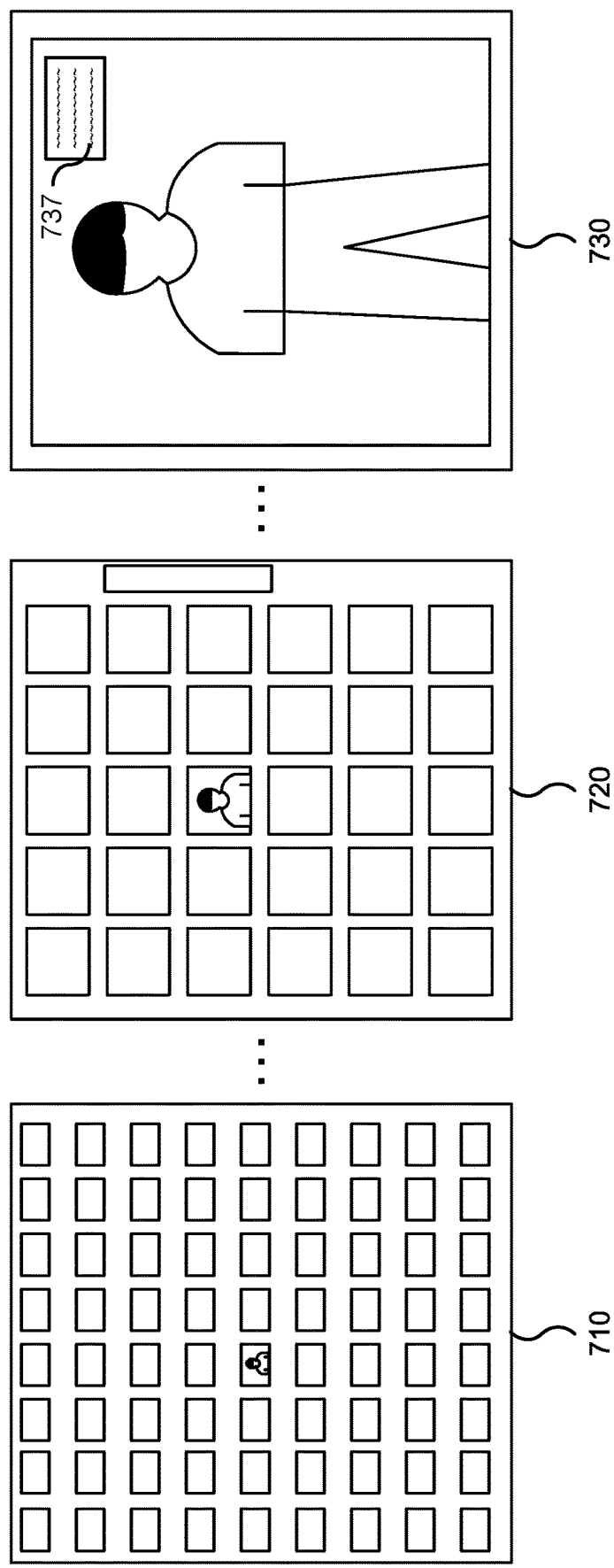
FIG. 7 is an illustration of a series of layouts for navigating content on a mobile device according to various embodiment.

FIG. 7 is an illustration of a series of layouts for navigating content on a mobile device according to one embodiment. In this example, layout 710 includes a grid of images. In one embodiment, layout 710 displays all images stored on the mobile device. In another embodiment, layout 710 is generated with a portion of an image collection stored on the mobile device. In one aspect, only a portion of layout 710 is viewed on the touchscreen. A user of the mobile device can manipulate layout 710 to view the remainder of the image collection. For example, the user may interact with touch sensor 528 of wearable device 500 of FIG. 5 to scroll layout 710 horizontally, vertically, or a combination thereof. In some embodiments, the user may interact with crown 412 of wearable device 400 of FIG. 4 to manipulate the view of layout 710.

As discussed above, elements or items of layout 710 (e.g., individual images) can be arranged in a grid of images. The grid of images may be constructed based on the density of images in the image collection. In another aspect, a grid of images may be constructed based on the density of images in a respective set or grouping of images.

In one embodiment, layout 720 displays a subset of the images presented in layout 710 based on an item of focus. In one aspect, layout 720 is generated with a view of all images in the subset presented by 710. In another aspect, only a portion of the subset presented layout 710 is viewed on the touchscreen according to layout 710. A user of the mobile device can manipulate layout 720 to view the remainder of the image collection.

In this example, a person's face and upper torso can be seen as one of the images arranged in layout 710 and layout 720. In response to a user interacting with layout 710 (e.g., using a touch screen or crown), the image with the person's face and upper torso is indicated or otherwise selected as an item of interest. Based on the image being selected as an item of interest, the view presented to the user transitions from a view of layout 710 to a view of layout 720. The images presented in layout 720 that surround the item of focus may be the same and have the same spatial relationship as those represented in layout 710. In some embodiments, the images presented in layout 720 that surround the item of focus may be related to the image based on selection criteria, such as photos taken on the same day, the same person's face being recognized in other photos, the same geographic location, most viewed, starred, or the like.

In various embodiments, the arrangement of images and the images themselves presented in layouts 710 and 720 can be an optimized according to a variety of methods. As discussed above, images to be presented within a layout can be determined and inter-image relationships within the layout can be selected according to rules. In other embodiments, how the images are presented are optimized, for example, by cropping an image to show a person's face or appear as uniform, by resizing images in order to maximize use of space within a layout, or the like. Images can further be arranged based on color data, metadata, or other criteria.

If the user again interacts with the touchscreen resulting in the previous item of focus remaining in focus, layout 730 is generated. In this example, a view of the item of focus is displayed allowing more of the image to be seen by the user. The view may still be a view of the full image, a view of a cropped or otherwise optimized image, or the like.

In various aspects, a user can interact with layout 730 to display information related to the item of focus (e.g., image metadata) or to perform one or more operations on the image. For example, as shown in layout 730, a box 735 having image metadata is displayed. In other embodiments, one or more user interface elements (e.g., icons or dialogs) can be displayed allowing the user to manipulate the image or use the image with one or more other application hosted by the mobile device.

In some embodiments, a navigation path represents a path through a plurality of layouts. For example, as the user chooses to view images related to the person's image (e.g., by selecting the person's image in layout 710), a record is made of the transition from layout 710 to layout 720 (and to layout 730). A user may decide to view other images in a former layout and the navigation path is used to determine the layout and what view of the layout is to be presented. Each time a user reassigns a new item of focus, the navigation path is recorded with the new transition between layouts. When a navigation path reaches the item of interest, a set or series of views can be presented to facilitate how the user interacts with the image.

Figure 8:
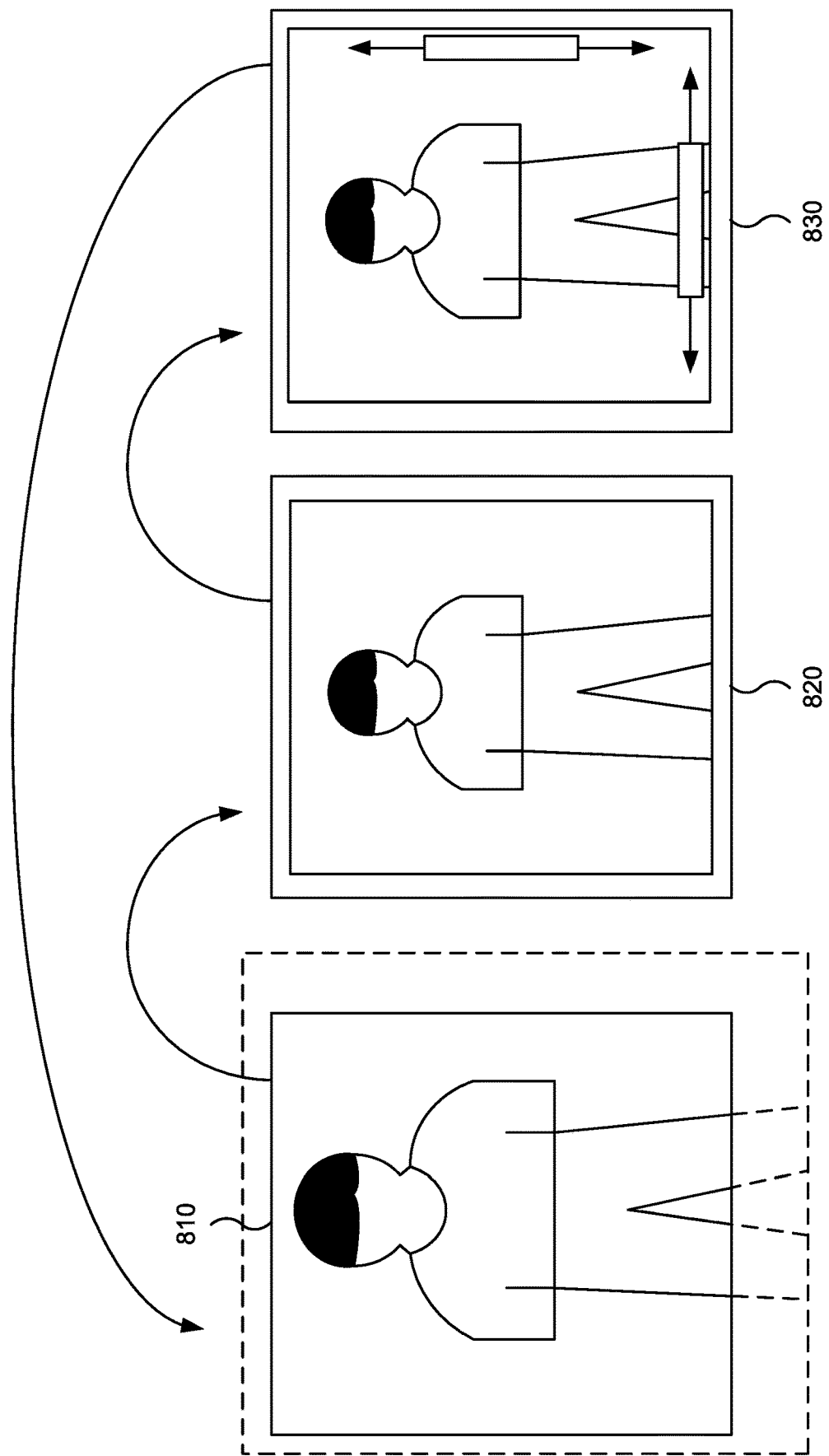
FIG. 8 is an illustration of a series of content views on a mobile device according to one embodiment.

FIG. 8 is an illustration of a series of content views on a mobile device according to one embodiment. In this example, layout 810 includes a view of the item of focus in which an optimization is used to fill the image to the screen. A zoomed view of the item of focus filling the touchscreen leaves the area of the image represented by the dashed lines outside of the presented view. In one embodiment, a user of the mobile device can manipulate layout 810 to view the remainder of the image. For example, the user may interact with the touch screen to tap, double tap, or otherwise gesture with the touchscreen and a view of the item of focus transitions to layout 820. In another embodiment, the user may interact with crown 412 of wearable device 400 of FIG. 4 to rotation between views of the item of focus. For example, a user may provide three rotations of crown 412 to cycle through layouts 810, 820, and 830 in a variety of orders.

In this example, the person's face, torso, and legs can be seen in layout 820 in which the image is fit to the view within the screen. In response to a user again interacting with the touchscreen, a view of the item of focus transitions to layout 830. In various embodiments, the view of the image remains fit to the view within the touchscreen, but one or more user interface elements are provided. The user interface elements may be horizontal or vertical scrollbars (or representations of horizontal or vertical scroll), icons, dialogs, or the like.

In one aspect, this tri-state viewing of an item of focus provides a convenient way for users to navigate different views of the same image. Layout 810 is presented first and generally is assigned to present an area of most interest to the user (e.g., a cropped or zoom view of a face). If the user is satisfied with having viewed the image or desires to view another image, the use can navigate to another layout and make a further selection. If the user desires to view the entire image, the state transitions to the view in which the image is fit to the screen in layout 820. If the user is satisfied with having viewed the image or desires to view another image, the use can navigate to another layout and make a further selection (with or without returning to layout 810). If the user desires to view more information about the image or perform one or more operations to the image, the state transitions to the view in which the image is fit to the screen in layout 830. Although transitions are depicted in a single direction, this is solely for the purposes of clarity and any number of transitions and their direction between states can be contemplated.

C. Transitions and Animations

Figure 9A:
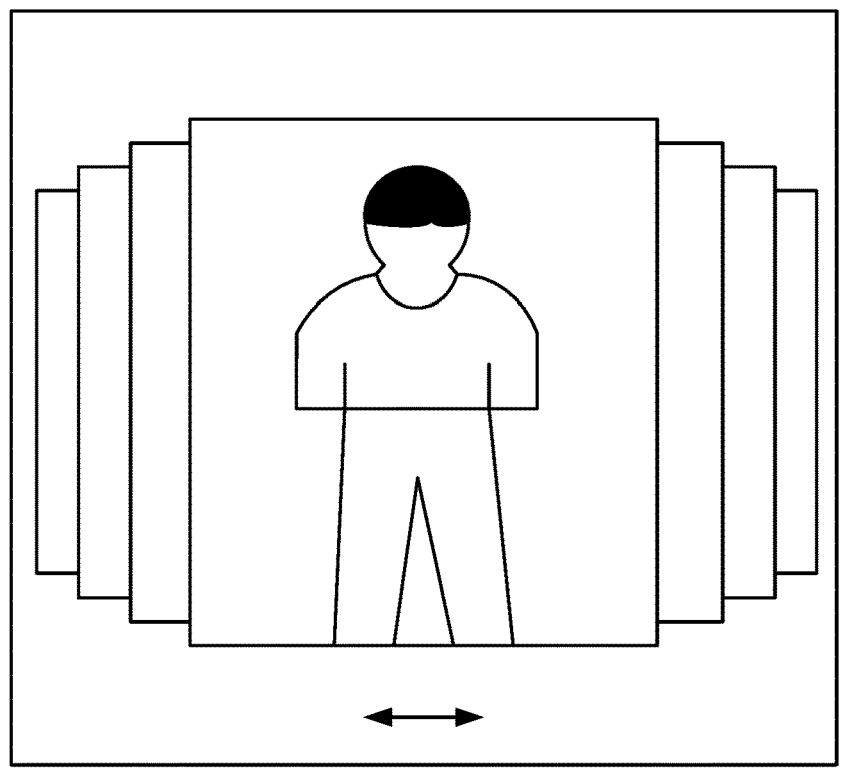
FIGS. 9A and 9B are illustrations of a flow-based transition view of content on a mobile device according to one embodiment.
Figure 9B:
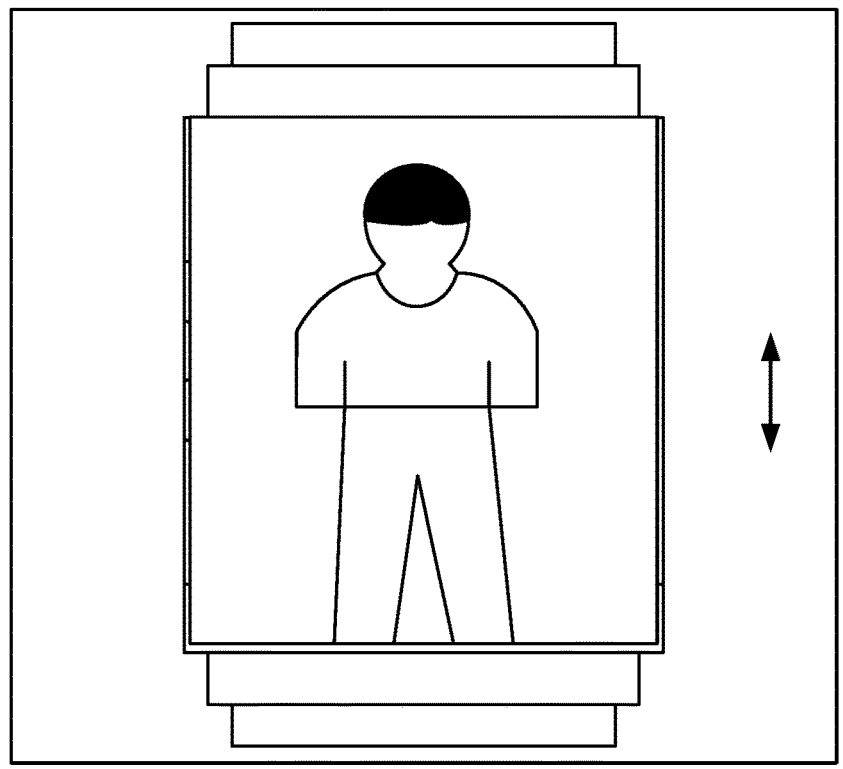

FIGS. 9A and 9B are illustrations of a flow-based transition view of content on a mobile device according to one embodiment. In this example, FIG. 9A provides a view of the item of focus. A portion of each image grouped with the item of focus (e.g., in layout 710 or layout 720 of FIG. 7) is also displayed to the left for items preceding the item of focus and to the right for items succeeding the item of focus. Various animations can be used to enhance the transition between images. In one aspect, a physics-based model is used to translate user input into the speed of transition, the type of animation, and the like.

In one aspect, a user can interact with touch sensor 528 of wearable device 500 of FIG. 5 to scroll through the group of images. For example, by swiping from left to right, all of the images shift in view from left to right and the item of focus changes to a new image in the group that preceded the previous item of focus in the group. By swiping from right to left, all the images shift in view from right to left and the item of focus changes to a new image in the group that succeeded the previous item of focus in the group. In another aspect, a user can interact with crown 412 of wearable device 400 of FIG. 4 to scroll through the group of images. For example, by rotating crown 412 backward, all the images shift in view from left to right and the item of focus changes to a new image in the group that preceded the previous item of focus in the group. By rotating crown 412 forward, all the images shift in view from right to left and the item of focus changes to a new image in the group that succeeded the previous item of focus in the group.

Figure 10A:
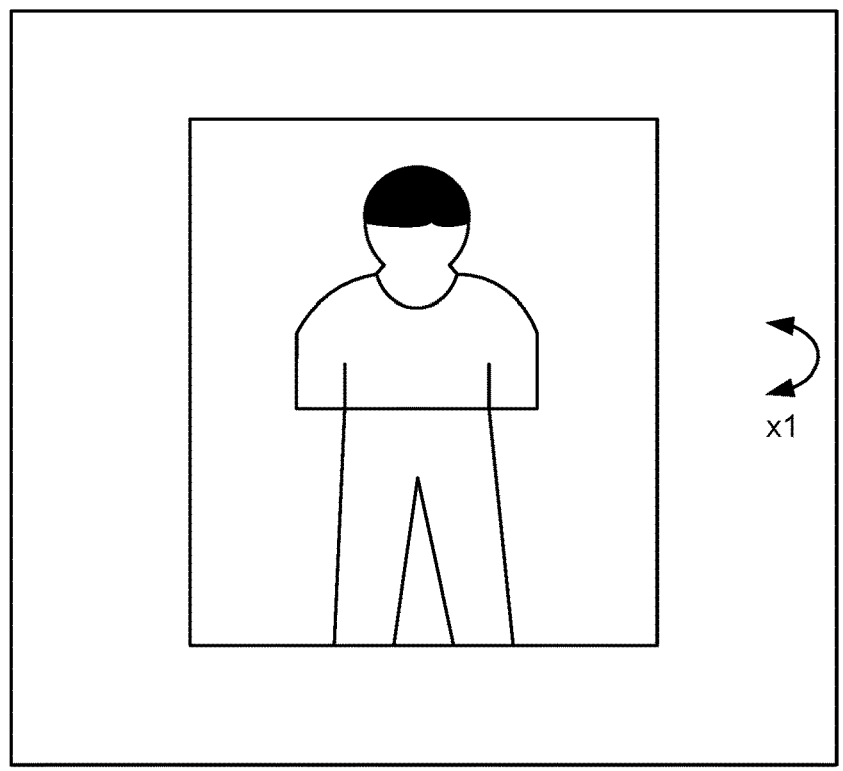
FIGS. 10A and 10B are illustrations of a physics-based transition view of content on a mobile device according to one embodiment.
Figure 10B:
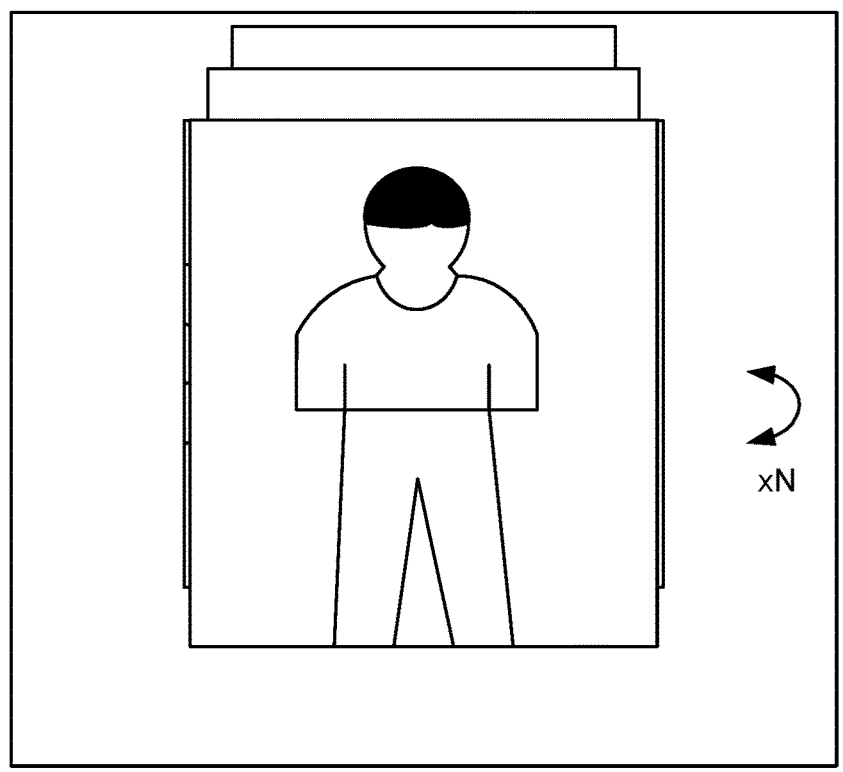

FIGS. 10A and 10B are illustrations of a physics-based transition view for content on a mobile device according to one embodiment. In this example, FIG. 10A provides a view of the item of focus. None of the other image grouped with the item of focus (e.g., in layout 710 or layout 720) are displayed. A user can interact with touch sensor 528 of wearable device 500 to scroll through the group of images. For example, by swiping left, right, up, or down with touch sensor 528 (i.e., x1 motion in a direction), a new image replaces the old and the item of focus changes to a new image (one at a time) in the group that preceded or succeeded the previous item of focus in the group. In another aspect, a user can interact with crown 412 of wearable device 400 of FIG. 4 to scroll through the group of images. For example, by rotating crown 412 backward, a new images replaces the old and the item of focus changes to a new image in the group that preceded the previous item of focus in the group. By rotating crown 412 forward, a new images replaces the old and the item of focus changes to a new image in the group that succeeded the previous item of focus in the group.

When input provided by a user, e.g., using touch sensor 528 or crown 412, satisfies predefined criteria, such as when speed of a motion exceeds a predetermined threshold (i.e., xN motion), a physics-based model can be used to translate the user input into an animation. In one embodiment, the animation appears as a tunnel view in FIG. 10B. The user then is provided a view of the size of the group as if the user is looking down a tunnel full of images (a predetermined number of images). The speed of the animation can be controlled by the model according to when the transitions stop, how fast a transition is between images, or whether the transitions appear to become slower with time.

Figure 11A:
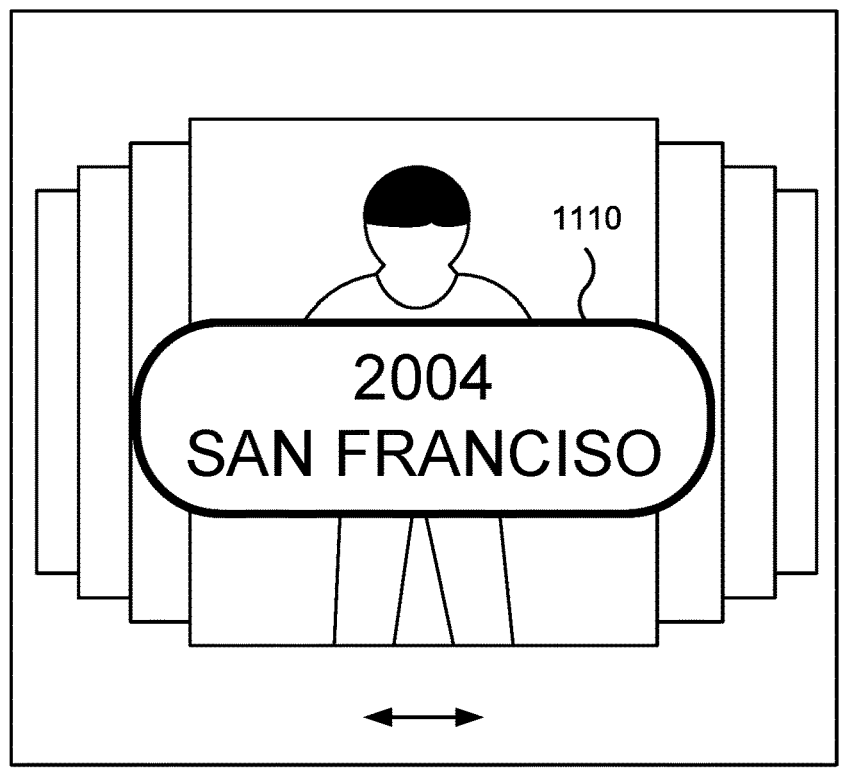
FIGS. 11A and 11B are illustrations of overlay views of content on a mobile device according to one embodiment.
Figure 11B:
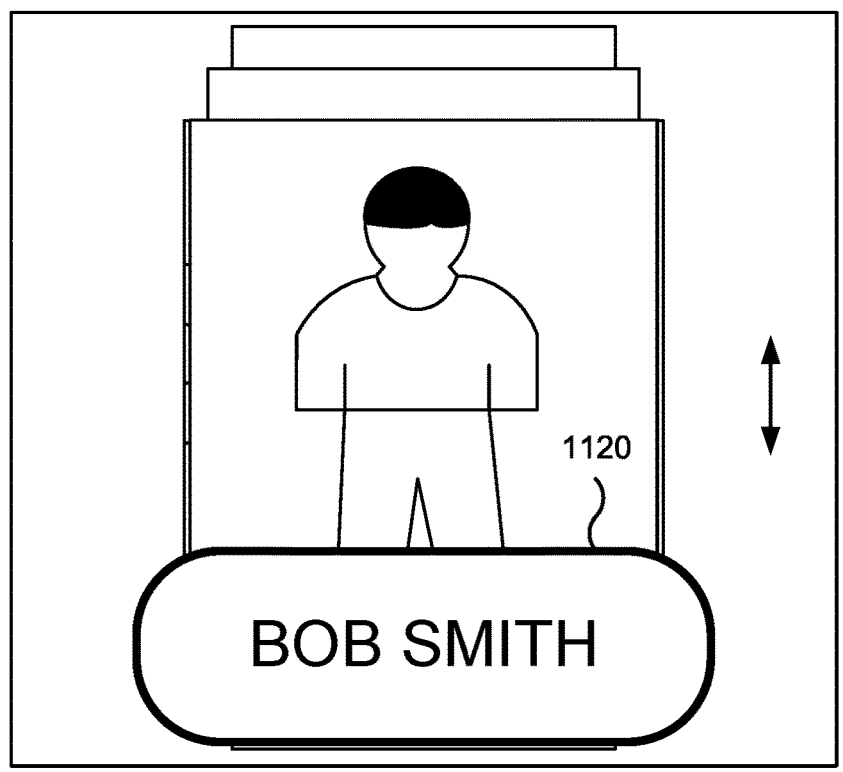

FIGS. 11A and 11B are illustrations of overlay views for content on a mobile device according to one embodiment. In this example, FIG. 11A provides a view of the item of focus as the user is scrolling through a group of images. If the rate of transitions exceeds a predetermined threshold, rather than blurring the images as they pass, an overlay can be presented that provides information about a subgroup of images, such as images metadata (e.g., overlay 1110 shown in FIG. 11A that identifies date and/or location) or other information (e.g., overlay 1120 that identifies a contact's name as in FIG. 11B). As the images transition at a rate too quick to provide much relevant information, information presented in the overly transitions at a slower rate providing meaningful navigation information to the user.

Figure 12C:
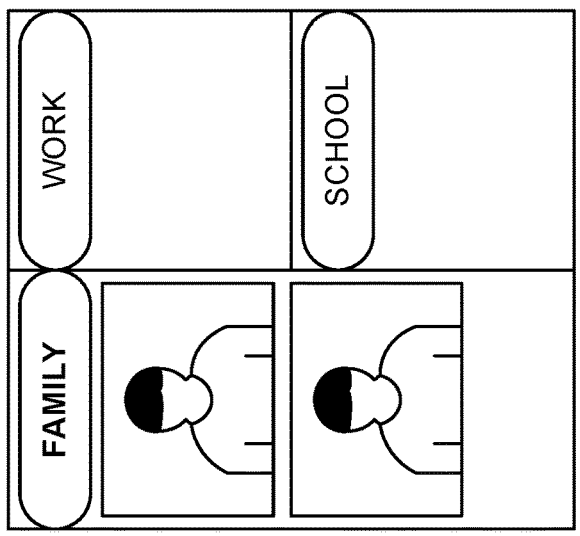
FIGS. 12A, 12B, and 12C are illustrations of various optimized navigation views of content on a mobile device according to one embodiment.
Figure 12B:
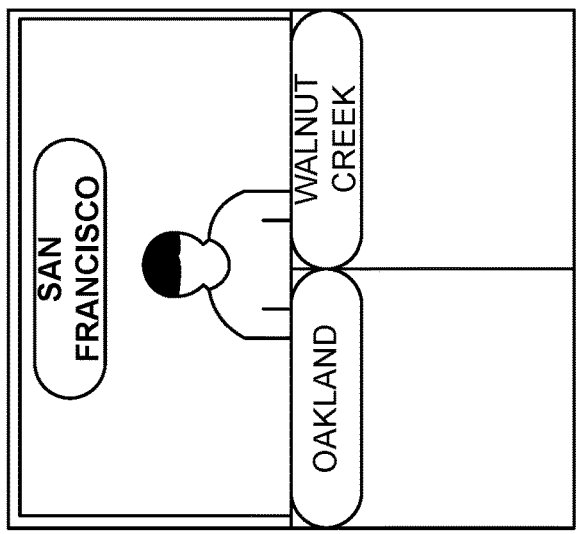
Figure 12A:
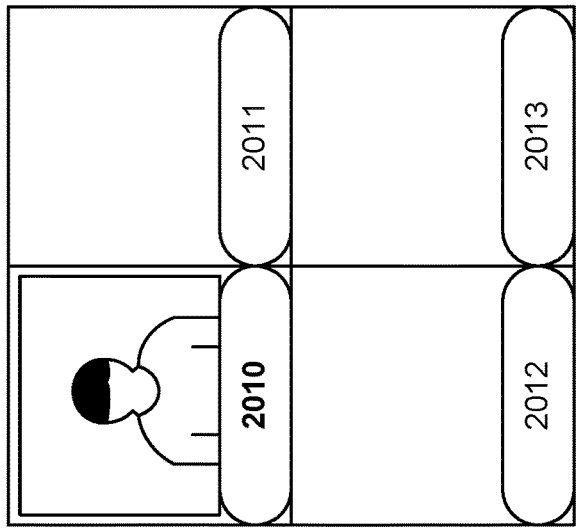

FIGS. 12A, 12B, and 12C are illustrations of various optimized navigation views for content on a mobile device according to one embodiment. In this example, FIG. 12A provides a view of a collection of photos. One or more of each image grouped according to year (e.g., 2010, 2011, 2012, and 2014) is shown with the layout divided into four areas (one for each year/group). A user can interact with touch sensor 528 of wearable device 500 to navigate through the various year-based groups of images. For example, by selecting the group associated with 2010, the item of focus changes to a new image in the group. In one embodiment, the new item of focus is the image or one of the images determined to represent the group. In another embodiment, a user can interact with crown 412 of wearable device 400 to cycle through the various year-based groups of images and then select a group through which to navigate.

FIG. 12B provides another optimized view of the collection of photos. One or more of each image grouped according to location (e.g., San Francisco, Oakland, and Walnut Creek) is shown with the layout divided into three areas (one horizontal larger pane and two other panes of relatively equal dimension below). A user can interact with touch sensor 528 of wearable device 500 to navigate through the various location-based groups of images. For example, by selecting the group associated with San Francisco, the item of focus changes to a new image in the group. In another embodiment, a user can interact with crown 412 of wearable device 400 to cycle through the various locations-based groups of images and then select a group through which to navigate.

FIG. 12C provides yet another optimized view of the collection of photos. One or more of each image grouped according to contact information (e.g., Family, Work, and School) is shown with the layout divided into three areas (one vertically larger pane and two other panes of relatively equal dimension to the side). A user can interact with touch sensor 528 of wearable device 500 to navigate through the groups of images. For example, by selecting the group associated with Family, the item of focus changes to a new image in the group with each photo associated with a contact assigned to the "family" group or circle. In another embodiment, a user can interact with crown 412 of wearable device 400 to cycle through the various contact groups and then select a group through which to navigate.

D. Rotary Input Navigation

Figure 13:
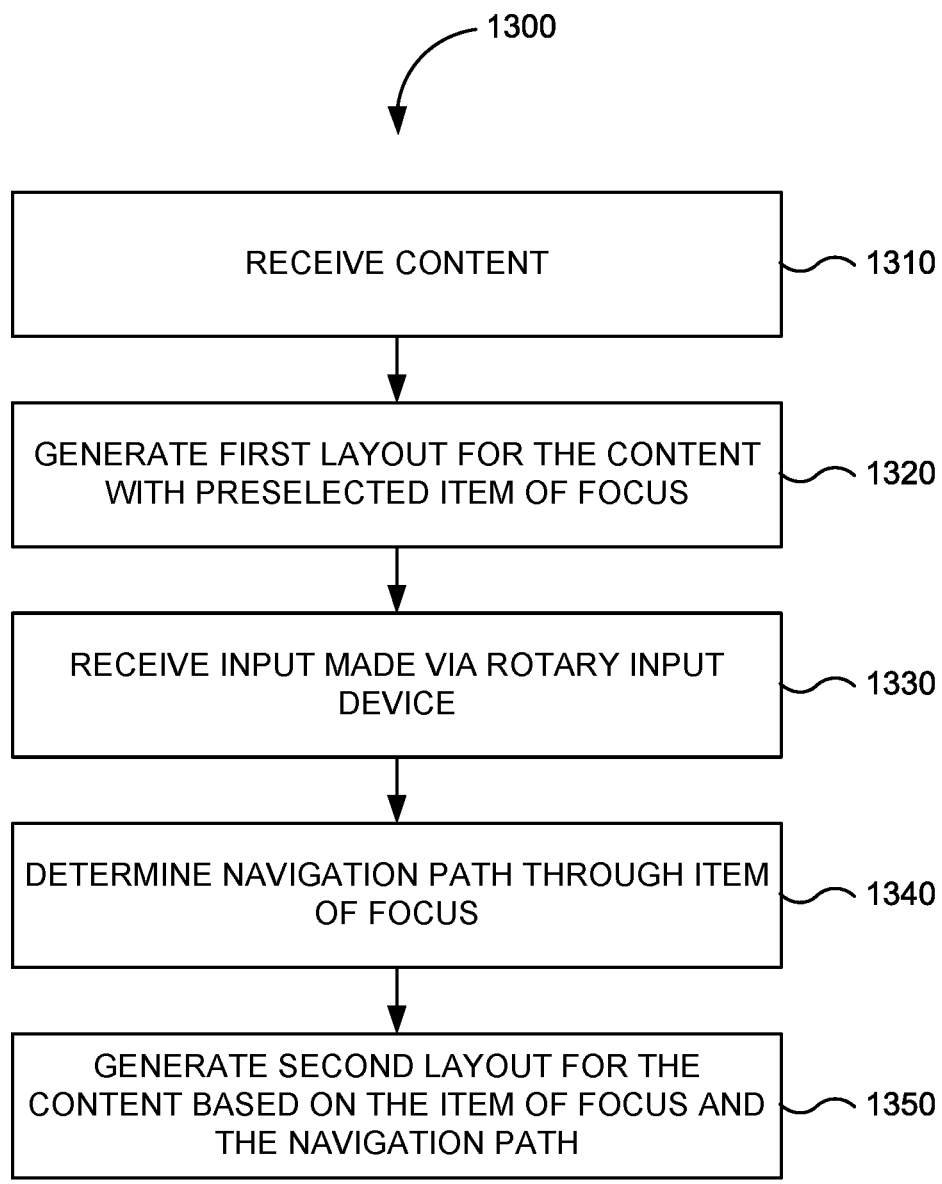
FIG. 13 is a flowchart of a method for navigating content on a mobile device using a rotary or rotation input device according to one embodiment.

FIG. 13 is a flowchart of method 1300 for navigating content on a mobile device using a rotary or rotation input device according to one embodiment. Processing in method 1300 depicted in FIG. 13 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 1310, content is received at a mobile device (e.g., mobile device 115). As discussed above, the content can include any type of information, such as text, audio, images or photos, video, multimedia information, documents, or the like. In step 1320, a first layout is generated for the content with a preselected item of focus. In various embodiments, the preselected item of focus can include an item at the center of a first layout. As discussed above, various means can be used to determine how items are arranged. Accordingly, even if one image is arranged to be at the center of a given layout at one instance, selection and optimization means can arranged to have another images at the center of another layout or the same layout at another instance.

In step 1330, input made via a rotary or rotation input device is received. A rotary input device (e.g., crown 412 of wearable device 400 of FIG. 4) as used herein includes any hardware and/or software elements that produce a rotational signal. The rotational signal can be indicative of direction of rotation, speed or amount of rotation, number of rotations, or the like. Based on the input made via rotary input device, a navigation path is determined through the item of focus in step 1340. The navigation path represents a path through the first layout to the preselected item of focus. The navigation path can be stored and used to navigate to another layout with another preselected item of focus. In step 1350, a second layout is generated based on the item of focus and the navigation path. The second layout may include another preselected item of focus or one or more views of the item of focus.

In various embodiments, transitions and animations can be influenced by the rotary input device. For example, navigation illustrated in FIGS. 7, 8, 9A-9B, 10A-10B, 11A-11B, and 12A-12C can be performed as well as any associated transitions or animations can be made. Referring to FIG. 13, a transition from layout 1310 of FIG. 13 to layout 1320 is made with one or more manipulations of the rotary input device. In response to a user again interacting with the rotary input device, a view of the item of focus transitions to layout 1330. Once within a view or layout, various user interface elements may be manipulated or controlled using the rotary input device. For example, a user can scroll through menu options, select a desired value within a range, or the like. In one embodiment, a user making edits to an image can vary the levels of brightness, contrast, or hue using the rotary input device. In other embodiments, the user can select from predetermined options using the rotary input device. In one aspect, the tri-state viewing of an item of focus discussed with respect to FIG. 8 can be invoked with the rotary input device.

In various embodiments, the rotary input device can be utilized in addition to or in the alternative of other user input (e.g., from touch sensor 528). In one aspect, the rotary input device provides a means to determine an appropriate level of zoom to apply to an image. In another aspect, the rotary input device invokes a navigation path through an item of interest, whether selected by the user or preselected. In some embodiments, the rotary input device is utilized to scroll through or otherwise display information that cannot fit within the available area of the touchscreen. In further embodiments, the rotary input device is used to determine the size of a crop or values of another edit to be made to an image.

E. Haptic Feedback

In various embodiments, a haptic feedback control (e.g., haptic output 524 of wearable device 500 of FIG. 5) receives events based on how a user navigates content and outputs forces based on those events. In one embodiment, mobile device 115 includes an actuator that outputs a force to provide a haptic sensation to a user. The actuator outputs the force based on transition events. The actuator can include a piezo-electric actuator, a voice coil actuator, a pager motor, a solenoid, or other type of actuator.

Figure 14:
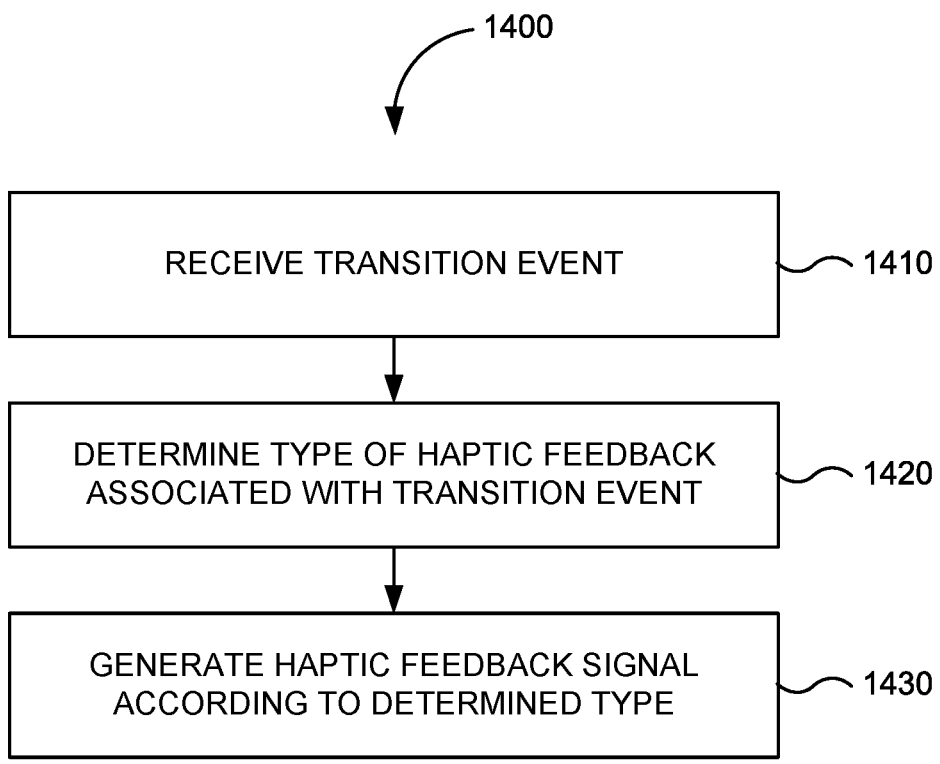
FIG. 14 is a flowchart of a method for navigating content on a mobile device using a touchscreen according to one embodiment.

FIG. 14 is a flowchart of method 1400 for navigating content on a mobile device using a touchscreen according to one embodiment. Processing in method 1400 depicted in FIG. 14 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 1410, a transition event is received at a mobile device (e.g., mobile device 115). For example, when a user contacts the touchscreen with a finger, a stylus, or other object to indicate an item of focus, a transition event is generated. As discussed above, there can be a variety of transitions between layouts and items of focus. Accordingly, in step 1420, a type of haptic feedback is determined based on the transition event. A haptic sensation, such as a pulse, vibration, or spatial texture, is determined based on the transition event. In step 1430, a haptic feedback signal is generated based on the determined type. The haptic feedback can assist and inform the user of interactions and events. For example, a pulse can be output when a transition ends provide a feeling of physicality to the images on the screen. In another example, the user is able to "feel" the number of transitions without having to observer the touchscreen or the rotational input device.

IV. Hardware Content Interactions

The communication of data from a device (e.g., mobile device 115 or companion device 120) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

Figure 15:
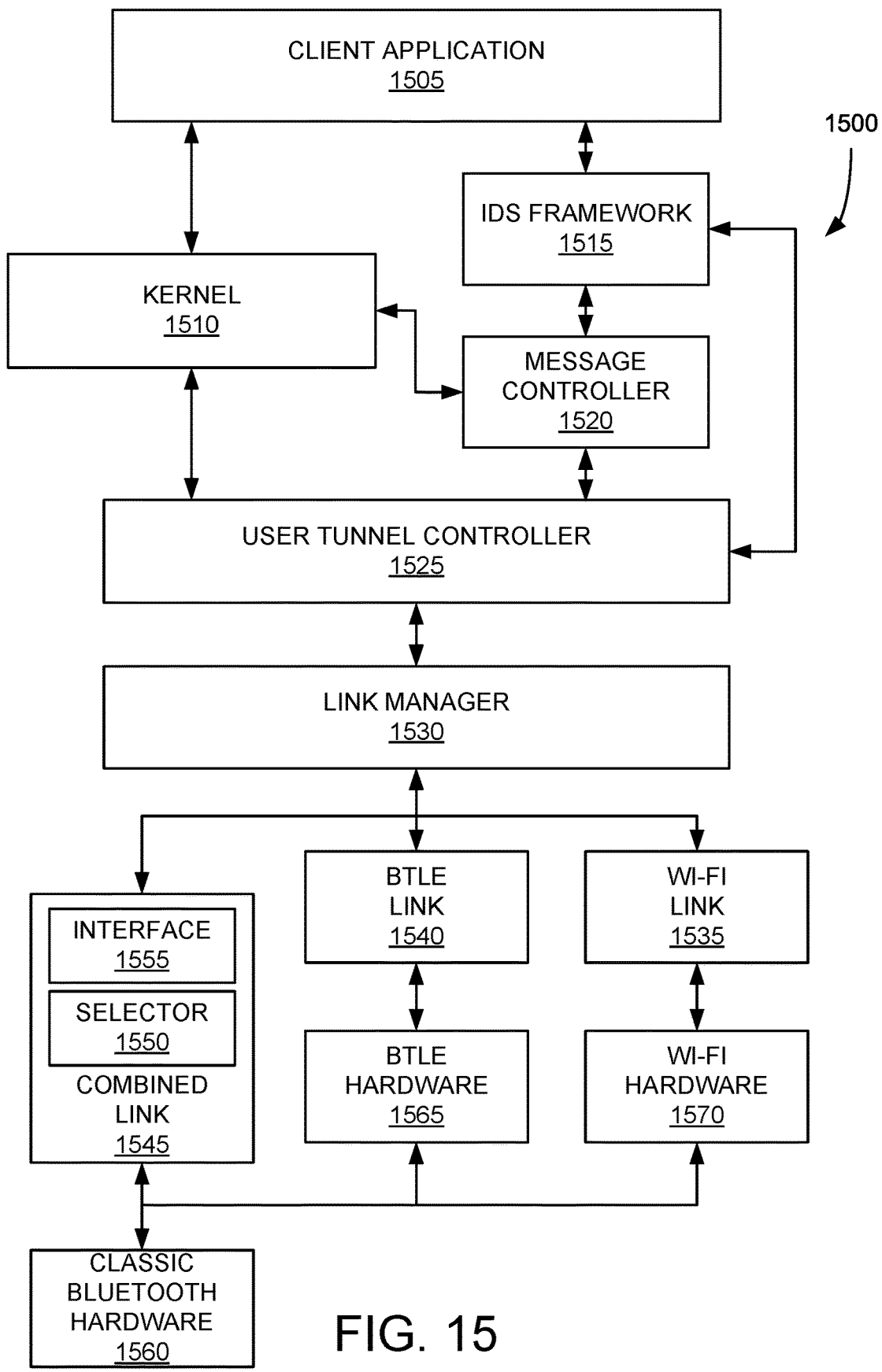
FIG. 15 shows a protocol stack for communicating data according to embodiments of the present invention

FIG. 15 shows a protocol stack 1500 for communicating data according to embodiments of the present invention. Various modules in protocol stack 1500 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 1505 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 1505 can submit an open socket request (e.g., in a streaming example). The socket request can use information from an identity services (IDS) framework 1515, which can provide an address (or other type of ID) for the other device. For example, client application 1505 can know account information for the second device (e.g., account information of a different or same user), and IDS framework 1515 can store a list of device IDs for a particular account. IDS framework 1515 can be in communication with identity management infrastructure 145 to obtain the list. Thus, IDS framework 1515 can store or otherwise obtain device IDs (e.g., addresses) for all devices that a user has registered with identity management infrastructure 145. For example, IDS framework 1515 can request via an IDS daemon to identity management infrastructure 145 to obtain the device IDs. In one implementation, the socket request can be made to kernel 1510.

In a messaging example, the request to send data can go to IDS framework 1515 to obtain a device ID, which can be sent to message a message controller 1520 and a user tunnel (UTUN) controller 1525. UTUN controller 1525 can establish a mapping between the device ID and an IP address (e.g., a virtual IP address) when the device ID is not an IP address. A socket can be created between message controller 1520 (which assigns a device ID to the socket) and kernel 1510 (which can assigns an address to the socket, such as a virtual IP address). UTUN controller 1520 can be used to create the socket connection between message controller 1520 and kernel 1510. In this manner, the send-date request from client application 1505 does not need to include a device ID, but can specify an account, which can then be cross-referenced by IDS framework 1515 with known devices of the account and their capabilities (e.g., if the request requires certain capabilities). Given that a device ID can be obtained, a pairing does not need to occur prior to creating the socket.

In various embodiments, IDS framework 1515 can receive a particular port/service at the other device from client application 1505, determine the port/service based on information obtained from identity management infrastructure 145, or determine the port/service from a token sent in the request. IDS framework 1515 can then communicate a device ID and other header information to message controller 1520 and/or UTUN controller 1525. IDS framework 1515 and UTUN controller 1525 can communicate via cross process communication (XPC). UTUN controller 1525 can be part of an IDS daemon, and can receive a device ID from identity management infrastructure 145.

As mentioned above, UTUN controller 1525 can create a virtual address that corresponds to the actual device address, where the virtual address can be used to create a virtual socket. A virtual socket can also be created using any device ID (e.g., an actual address of a device or other ID). As an example, a socket can be created for communication between client application 1505 and kernel 1510 (e.g., in a streaming context), where kernel 1510 can have various sockets open with various client applications. Kernel 1510 can have a single connection to UTUN controller 1525 for the other device and multiplex (mux) the data from various client applications into the single connection. Instead or in addition, UTUN controller 1525 can also perform the muxing, e.g., if multiple socket exist between kernel 1510 and UTUN controller 1525 for various client applications to the other device. Incoming data can be demultiplexed (demuxed) for sending to the destination client application.

As another example, a socket can be created between kernel 1510 and message controller 1520 (e.g., in a messaging context), where a socket can be created for each destination device, with different sockets to a same device potentially having different priorities. Thus, a particular virtual socket can be associated with a particular device and a particular priority (e.g., high and low). Message controller 1520 can have various connections to various client applications. Thus, message controller 1520 can provide mux/demux capabilities.

UTUN controller can create a primary socket with the other device. When UTUN controller 1525 receives data using a virtual connection associated with the second device, it can then map the virtual connection to the primary socket for communicating with the other device. All data for the other device can then be sent out through the primary socket. The virtual address for a virtual socket can be passed back to client application 1505, e.g., in the stream context. In one embodiment, a virtual socket involving kernel 1510 is a TCP socket. The virtual address can have a same format as a regular address, e.g., an IPv6 address. A mux module can include any combination of kernel 1510, message controller 1520, and UTUN controller 1525.

When client application 1505 sends data, client application 1505 can use the virtual socket to send data to kernel 1510. For example, the data can be sent using TCP via the virtual socket. Kernel 1510 can implement an UTUN interface for communicating with UTUN controller 1525. Kernel 1510 would pass the data (e.g., with a TCP header) and the virtual socket identifying the virtual address to UTUN controller 1525, which would then use the virtual address to resolve the device address for determining the device socket.

When sending to the data over the device socket, a link manager 1530 can determine which link to use. A link can be a particular combination of a wireless interface protocol (e.g., Bluetooth or Wi-Fi), a transport protocol (e.g., TCP, UDP, etc.), and a destination device. In this manner, UTUN controller 1525 does not need to know how the data is being sent, but instead can simply send the data to link manager 1530.

In various embodiments, the determination by link manager 1530 can be made per data packet, per set of data packets, per device socket, and may change from one data packet to another. Link manager 1530 may then select a link for sending the data. In the example shown, a Wi-Fi link 1535 provides software drivers for communicating with one or more Wi-Fi protocols, and BLTE link 1540 provides software drivers for communicating with Bluetooth LE. Wi-Fi link 1535 is in communication with Wi-Fi hardware 1570, and BLTE link 1540 is in communication with BTLE hardware 1565. Wi-Fi link 1535 can be used for various Wi-Fi protocols, such as infra-WiFi (infrastructure WiFi). In one embodiment, link manager 1530 can try all links to determine whether any of the links can contact the other device, and then use a connected link with a highest predetermined rank or dynamic rank.

Hardware 1565-1570 can be in communication with links assigned to various devices. For example, links 1535, 1540, and 1545 can be assigned for communication with a second device. In addition, other links that are assigned for communication with a third device can also be in communication with hardware 1565-1570. When a particular hardware receives data, software can identify a particular sending device and then determine the corresponding link, e.g., using header information to determine the link corresponding to the sending device and transport protocol.

In some embodiments, a combined link 1545 can include an interface 1555 for communicating with link manager 1530 and a selector 1550 that selects a particular protocol to use. The protocols can be the same or different from that available to link manager 1530. Selector 1550 can perform similar functions as link manager 1530 in that a particular link is selected. However, link manager 1530 and selector 1550 can use different criteria for determining which link to use. For example, link manager 1530 can determine to use combined link 1545, and selector 1550 can then determine that BTLE hardware 1565 is to be used. The hardware can be contained on same or separate chips.

One or more protocols can be only available via combined link 1545, such as classic Bluetooth hardware 1560. Link manager 1530 and selector 1550 can use various criteria for determining which link to use, such as power usage of a link, speed of a link (e.g., real-time data rate), and signal strength of a link. A goal of the optimization for selecting a link can be to provide a minimal data rate at a lowest possible energy.

V. Conclusion

Figure 16:
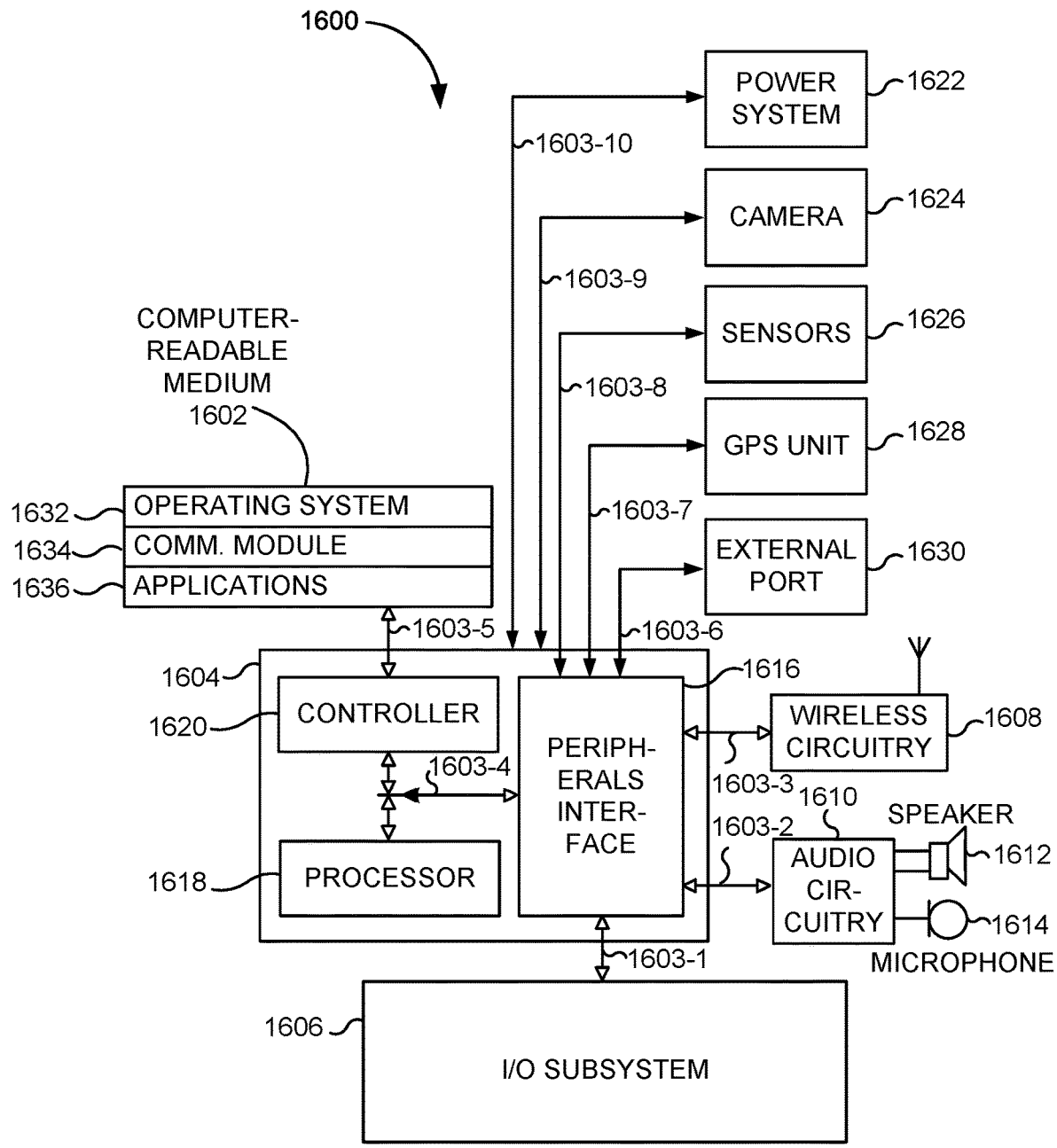
FIG. 16 is a block diagram of a portable electronic device or mobile device according to an embodiment.

FIG. 16 is a block diagram of a portable electronic device or mobile device 1600 according to an embodiment. Mobile device 1600 generally includes computer-readable medium 1602, a processing system 1604, an Input/Output (I/O) subsystem 1606, wireless circuitry 1608, and audio circuitry 1610 including speaker 1612 and microphone 1614. These components may be coupled by one or more communication buses or signal lines 1603. Mobile device 1600 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 16 is only one example of an architecture for mobile device 1600, and that mobile device 1600 can have more or fewer components than shown, or a different configuration of components. The various components shown in FIG. 16 can be implemented in hardware, software, or a combination of both hardware and software, including one or more signal processing and/or application specific integrated circuits.

Wireless circuitry 1608 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1608 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

Wireless circuitry 1608 is coupled to processing system 1604 via peripherals interface 1616. Interface 1616 can include conventional components for establishing and maintaining communication between peripherals and processing system 1604. Voice and data information received by wireless circuitry 1608 (e.g., in speech recognition or voice command applications) is sent to one or more processors 1618 via peripherals interface 1616. One or more processors 1618 are configurable to process various data formats.

Peripherals interface 1616 couple the input and output peripherals of device 1600 to the one or more processors 1618 and computer-readable medium 1602. One or more processors 1618 communicate with computer-readable medium 1602 via a controller 1620. Computer-readable medium 1602 can be any device or medium that can store code and/or data for use by one or more processors 1618. Medium 1602 can include a memory hierarchy, including cache, main memory, and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1616, one or more processors 1618, and memory controller 1620 can be implemented on a single chip, such as processing system 1604. In some other embodiments, they can be implemented on separate chips.

Mobile device 1600 also includes a power system 1622 for powering the various hardware components. Power system 1622 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1600 includes a camera 1624. In some embodiments, mobile device 1600 includes sensors 1626. Sensors can include accelerometers, compass, gyrometer, pressure sensors, audio sensors, light sensors, barometers, and the like. Sensors 1626 can be used to sense location aspects, such as auditory or light signatures of a location. In some embodiments, mobile device 1600 can include a GPS receiver, sometimes referred to as a GPS unit 1628. A mobile device can use a satellite navigation system, such as the Global Positioning System (GPS), to obtain position information, timing information, altitude, or other navigation information. In some embodiments, mobile device 1600 can include external port 1630 (e.g., USB, FireWire, Lightning connector, 160-pin connector, etc.). External port 1630 can be adapted for coupling directly to other devices or indirectly over a network (e.g., the Internet, wireless LAN, etc.).

One or more processors 1618 run various software components stored in medium 1602 to perform various functions for device 1600. In some embodiments, the software components include operating system 1632, communication module (or set of instructions) 1634, and other applications (or set of instructions) 1636. Operating system 1632 can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1634 facilitates communication with other devices over one or more external ports 1630 or via wireless circuitry 1608 and includes various software components for handling data received from wireless circuitry 1608 and/or external port 1630.

The one or more applications 1636 on mobile device 1600 can include any applications installed on the device 1600, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1606 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1606 can include a display and user input devices such as a keyboard, mouse, and/or trackpad. In some embodiments, I/O subsystem 1606 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1602) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1606 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1600 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   at a mobile device with one or more processors, a display device, and a rotation input device:
   rendering a first set of a plurality of images stored by the mobile device into a first layout using the display device;
   receiving rotation input from the rotation input device;
   determining a second layout different from the first layout based at least in part on the rotation input;
   determining a second set of the plurality of images different from the first set of the plurality of images based at least in part on a navigation path, wherein the navigation path comprises an indication of how a view of the plurality of images would change between the first layout and the second layout; and
   rendering a subset of the plurality of images into the second layout using the display device.

2. The method of claim 1, wherein rendering the first or second layout comprises generating a grid of images constructed based at least in part on a density factor associated with images in their respective set.

3. The method of claim 1, wherein rendering the first or second layout comprises generating an optimized layout of images constructed using image selection rules.

4. The method of claim 1, further comprising determining the navigation path based at least in part on a center image in the first layout.

5. The method of claim 1, further comprising determining the navigation path based at least in part on user input received via a touchscreen.

6. The method of claim 1, further comprising:
   receiving additional rotation input from the rotation input device; and
   rendering one or more views, transitions, or animations of the images in the second layout based at least in part on the additional rotation input, wherein at least one of the one or more views, transitions, or animations includes:
   generating a scroll through a set of images,
   generating a stack transition,
   generating deck of cards transition,
   generating a tunnel view transition,
   manipulating a viewport of an image quilt, or
   generating a metadata view.

7. The method of claim 1, further comprising generating haptic feedback based at least in part on the rotation input.

8. The method of claim 1, further comprising generating one or more visual effects based at least in part on a rotational speed of the rotation input and a physics-based model.

9. The method of claim 1, further comprising navigating one or more metadata or image editing options using the rotation input device.

10. The method of claim 1, further comprising reversing a path through layouts of subsets of images based at least in part on a stored navigation path and using the rotation input device.

11. A device, comprising:
 a memory;
 a rotational input device; and
 one or more processors configured to execute instructions to:
  render a first set of a plurality of images stored by the device into a first layout using a display device;
  receive rotation input from the rotation input device;
  determine a second layout different from the first layout based at least in part on the rotation input;
  determine a second set of the plurality of images different from the first set of the plurality of images based at least in part on a navigation path, wherein the navigation path comprises an indication of how a view of the plurality of images would change between the first layout and the second layout; and
  render a subset of the plurality of images into the second layout using the display device.

12. The device of claim 11, wherein rendering the first or second layout comprises generating a grid of images constructed based at least in part on a density factor associated with images in their respective set or generating an optimized layout of images constructed using image selection rules.

13. The device of claim 11, further comprising instructions to:
 receive additional rotation input from the rotation input device; and
 render one or more views, transitions, or animations of the images in the second layout based at least in part on the additional rotation input, wherein at least one of the one or more views, transitions, or animations includes:
  generating a scroll through a set of images,
  generating a stack transition,
  generating deck of cards transition,
  generating a tunnel view transition,
  manipulating a viewport of an image quilt, or
  generating a metadata view.

14. The device of claim 11, further comprising instructions to generate one or more visual effects based at least in part on a rotational speed of the rotation input and a physics-based model.

15. The device of claim 11, further comprising instructions to navigate one or more metadata or image editing options using the rotation input device.

16. The device of claim 11, further comprising instructions to reverse a path through layouts of subsets of images based at least in part on a stored navigation path and using the rotation input device.

17. A non-transitory computer-readable storage medium storing computer-executable instructions that, when executed by one or more processors of a mobile device with a rotation input device and a memory, configure the one or more processors to perform operations comprising:
 rendering a first set of a plurality of images stored by the mobile device into a first layout using a display device;
 receiving rotation input from the rotation input device;
 determining a second layout different from the first layout based at least in part on the rotation input;
 determining a second set of the plurality of images different from the first set of the plurality of images based at least in part on a navigation path, wherein the navigation path comprises an indication of how a view of the plurality of images would change between the first layout and the second layout; and
 rendering a subset of the plurality of images into the second layout using the display device.

18. The non-transitory computer-readable storage medium of claim 17, wherein rendering the first or second layout comprises at least one generating a grid of images constructed based at least in part on a density factor associated with images in their respective set or generating an optimized layout of images constructed using image selection rules.

19. The non-transitory computer-readable storage medium of claim 17, further comprising determining the navigation path based at least in part on a center image in the first layout or user input received via a touchscreen.

20. The non-transitory computer-readable storage medium of claim 17, further comprising:
 receiving additional rotation input from the rotation input device; and
 rendering one or more views, transitions, or animations of the images in the second layout based at least in part on the additional rotation input;
 wherein at least one of the one or more views, transitions, or animations includes:
  generating a scroll through a set of images,
  generating a stack transition,
  generating deck of cards transition,
  generating a tunnel view transition,
  manipulating a viewport of an image quilt, or
  generating a metadata view.

* * * * *